US011659481B2

(12) United States Patent
Fiorese et al.

(10) Patent No.: US 11,659,481 B2
(45) Date of Patent: May 23, 2023

(54) METHODS AND SYSTEMS FOR UE TO REQUEST APPROPRIATE NSSAI IN 5G

(71) Applicant: Telefonaktiebolaget LM Ericsson (publ), Stockholm (SE)

(72) Inventors: Virgilio Fiorese, McKinney, TX (US); Nipun Sharma, New Delhi (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 171 days.

(21) Appl. No.: 17/059,235

(22) PCT Filed: May 26, 2018

(86) PCT No.: PCT/IB2018/053763
§ 371 (c)(1),
(2) Date: Nov. 26, 2020

(87) PCT Pub. No.: WO2019/229492
PCT Pub. Date: Dec. 5, 2019

(65) Prior Publication Data
US 2021/0204207 A1 Jul. 1, 2021

(51) Int. Cl.
*H04W 48/18* (2009.01)
*H04W 8/08* (2009.01)
(Continued)

(52) U.S. Cl.
CPC .......... *H04W 48/18* (2013.01); *H04W 8/08* (2013.01); *H04W 8/20* (2013.01); *H04W 48/14* (2013.01); *H04W 48/16* (2013.01)

(58) Field of Classification Search
CPC ....... H04L 67/02; H04L 67/146; H04L 69/24; H04W 12/08; H04W 48/02; H04W 48/14;
(Continued)

(56) References Cited

U.S. PATENT DOCUMENTS 11,246,183 B2 * 2/2022 Kim .................. H04W 76/28
2017/0303259 A1 10/2017 Lee et al.
(Continued)

FOREIGN PATENT DOCUMENTS

KR 20180081969 A * 1/2017
WO 2017200978 A1 11/2017

OTHER PUBLICATIONS

Author Unknown, "Technical Specification Group Services and System Aspects; System Architecture for the 5G System; Stage 2 (Release 15)," Technical Specification 23.501, Version 15.1.0, 3GPP Organizational Partners, Mar. 2018, 201 pages.
(Continued)

*Primary Examiner* — Charles N Appiah
*Assistant Examiner* — Nicole M Louis-Fils
(74) *Attorney, Agent, or Firm* — Sage Patent Group

(57) ABSTRACT

Methods and systems for exposing the network slice selection process to the entities within or attached to a client device are provided. According to one aspect of the present disclosure, a method for allowing slice consumers within or attached to the client device to access and use Network Slice Selection Assistance Information (NSSAI) comprises, at a client device: receiving, at an Application Programming Interface (API) layer within the client device, a query for NSSAI, the query being sent by a slice consumer; sending, to a Fifth Generation modem within the client device, the query for NSSAI; receiving, from the 5G modem, a response to the query for NSSAI; and sending, to the slice consumer, the response to the query for NSSAI. Enhancements to the N1 interface as well to Core Access and Mobility Management Function (AMF), Application Function (AF), and Network Exposure Function (NEF) are presented.

30 Claims, 17 Drawing Sheets

(51) Int. Cl.
*H04W 8/20* (2009.01)
*H04W 48/14* (2009.01)
*H04W 48/16* (2009.01)

(58) Field of Classification Search
CPC ....... H04W 48/16; H04W 48/18; H04W 4/20; H04W 8/08; H04W 8/18; H04W 8/20
See application file for complete search history.

(56) References Cited

U.S. PATENT DOCUMENTS

| 2018/0192390 | A1* | 7/2018 | Li | H04W 16/04 |
| 2018/0352501 | A1* | 12/2018 | Zhang | H04W 76/11 |
| 2019/0356743 | A1* | 11/2019 | Park | H04L 67/61 |
| 2020/0100080 | A1* | 3/2020 | Mladin | H04W 4/70 |
| 2020/0128614 | A1* | 4/2020 | Ying | H04W 12/06 |
| 2020/0267753 | A1* | 8/2020 | Adjakple | H04W 72/14 |
| 2021/0194970 | A1* | 6/2021 | Li | H04W 40/24 |
| 2021/0235266 | A1* | 7/2021 | Starsinic | H04L 65/1073 |

OTHER PUBLICATIONS

Author Unknown, "Technical Specification Group Services and System Aspects; Procedures for the 5G System; Stage 2 (Release 15)," Technical Specification 23.502, Version 15.1.0, 3GPP Organizational Partners, Mar. 2018, 285 pages.

Author Unknown, "Technical Specification Group Services and System Aspects; Policy and Charging Control Framework for the 5G System; Stage 2 (Release 15)," Technical Specification 23.503, Version 15.1.0, 3GPP Organizational Partners, Mar. 2018, 65 pages.

International Search Report and Written Opinion for International Patent Application No. PCT/IB2018/053763, dated Feb. 21, 2019, 17 pages.

* cited by examiner

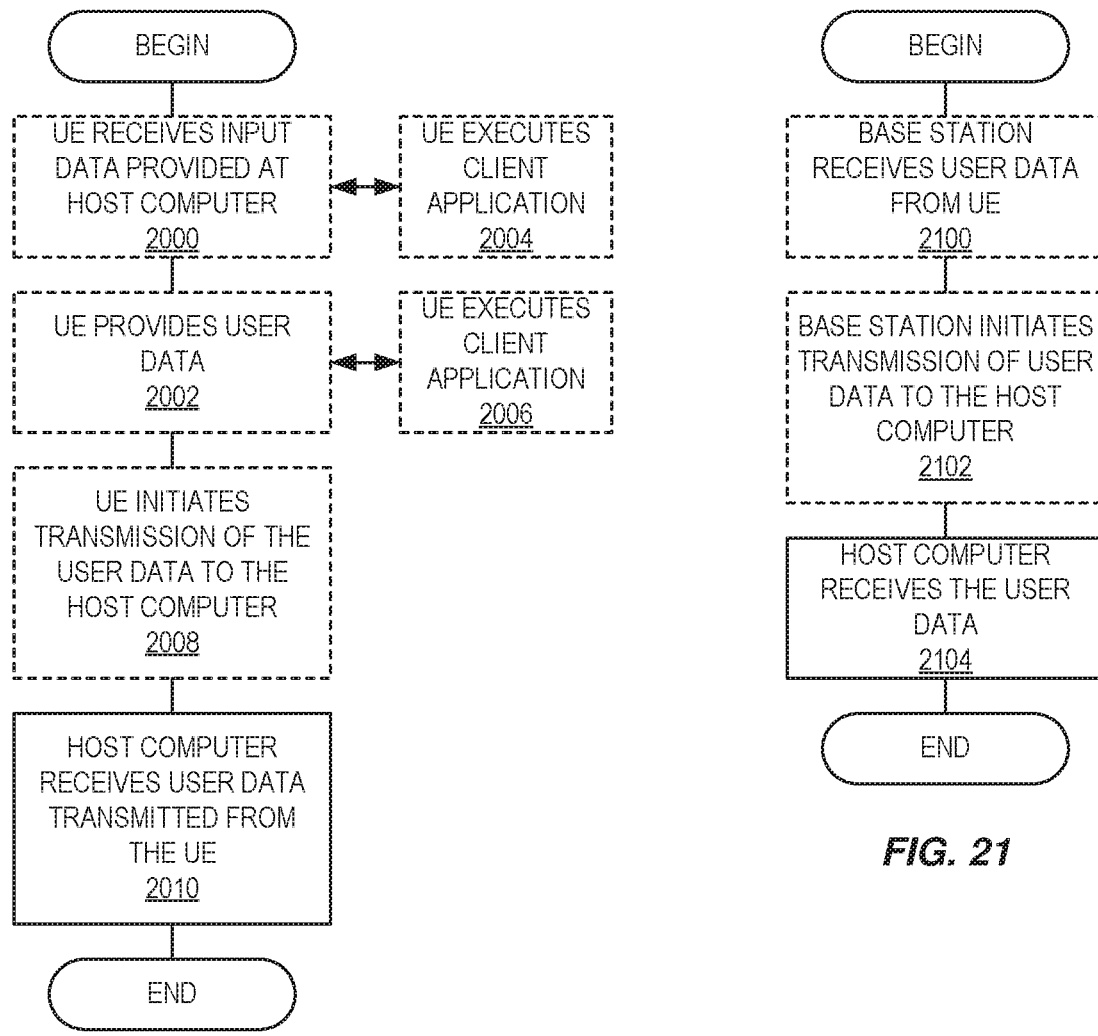

METHODS AND SYSTEMS FOR UE TO REQUEST APPROPRIATE NSSAI IN 5G

This application is a 35 U.S.C. § 371 national phase filing of International Application No. PCT/IB2018/053763, filed May 26, 2018, the disclosure of which is incorporated herein by reference in its entirety.

TECHNICAL FIELD

The present disclosure relates to User Equipment (UE) operating within a Fifth Generation (5G) network or other network that supports network slices, where a UE can be any device containing a 5G Modem, such as, but not limited to, a smart phone, a fixed wireless access Customer Premise Equipment (CPE), Vehicles Connectivity Systems, Robots/Machines connectivity Systems, Connected Goggles, Unmanned Aerial Vehicles (UAVs)/Drones, Airplanes Connectivity Systems, etc.

BACKGROUND

Network slicing is a key Fifth Generation (5G) network concept introduced to model and realize specific and dedicated connectivity services over network service provider networks. 5G introduces a Network Slice Selection Function (NSSF), which assists in selecting a network slice. 5G also introduces the concept of Network Slice Selection Assistance Information (NSSAI) to assist slice selection. The NSSAI consists of a list of Single NSSAIs (S-NSSAIs). A network, such as a Public Land Mobile Network (PLMN), combines different 5G core network elements to deliver much more flexible types of network slices (i.e., NSSAIs), and these network slices can be delivered in real time based on S-NSSAIs values provided in the N1 interface.

FIG. 1 illustrates a conventional 5G telecommunications network 100 in which a UE 102 is operating. In the embodiment illustrated in FIG. 1, network 100 includes a Radio Access Node/Access Node ((R)AN) 104, a User Plane Function (UPF) 106, a Core Access and Mobility Management Function (AMF) 108, a Session Management Function (SMF), 110, a Policy Control Function (PCF) 112, an Application Function (AF) 114, a NSSF 116, a Authentication Server Function (AUSF) 118, a Unified Data Management function (UDM) 120, and a Network Exposure Function (NEF) 122. In FIG. 1, some of the standard interfaces are labeled, e.g., "N1," "N2," etc. The network 100 shown in FIG. 1 is illustrative and not limiting, i.e., the enhanced UE 102 disclosed herein may operate in telecommunication networks having other nodes or combinations of nodes. It should be noted that, as used herein, the term "(R)AN" refers to an entity that may be Radio Access Network, a (non-radio) Access Network, or a combination of the two. Hereinafter, the terms "RAN" and "(R)AN" will be used synonymously, except where "RAN" is explicitly indicated as referring to a Radio Access Network exclusively.

Prior to 5G, there was no network slice or NSSAI. The closest thing conceptually was a Quality of Service (QoS) Class Identifier (QCI), which allowed the network to pre-define some network elements characteristics, i.e., QoS, depending on the type of service being requested by the UE. This pre-5G mechanism differs from network slices, however, in that a UE was limited to a single network slice and a UE was not allowed to have multiple network slices for each Protocol Data Unit (PDU) session.

In contrast, 5G network slicing allows simultaneous connectivity to multiple network slices per UE (and the multiple network slices are not constrained to all occupy the same physical path), extends network slice awareness out to the RAN (that is, 5G network slices are "end-to-end"), and enhances the possibilities to provide isolation between network slices. A UE may be associated with at most eight different S-NSSAIs in total, and the AMF instance serving the UE logically belongs to each of the network slice instances serving the UE, e.g., the AMF instance is common to the network slice instances serving the UE.

The PLMN combines different 5G core network functions to deliver much more flexible type of network slices (NSSAIs), and these network slices can be delivered in real time based the information provided by the UE in the N1 interface during the registration procedure. The NSSAI may be a Configured NSSAI, a Requested NSSAI or an Allowed NSSAI. During the registration process the AMF will consult the NSSF, based on the UE request, and so authorize or not the NSSAIs associated with the information coming from UE.

FIG. 2 is a signaling message diagram illustrating a portion of a conventional process by which a UE 102 establishes a PDU Session with a Data Network (DN) 200. The process starts when the UE 102 sends a PDU Session Establishment request (message 202) to the AMF 108, which selects an SMF (step 204), and sends to the SMF 110 a request for creation of a PDU Session Context (step 206). The SMF 110 communicates with the UDM 120 for the purpose of registration and subscription retrieval (step 208), after which the UE 102 performs PDU Session authentication and authorization (step 210) with the DN 200. At some point, the UE 102 may request that the existing PDU Session be modified (message 212), which triggers the AMF 108 to send to the SMF 110 a request to update the PDU Session Context (message 214), causing the SMF to communicate with the UDM 120 for the purpose of updating the subscription(s) (step 216). FIG. 2 illustrates the point that, in conventional 5G networks, the network slice awareness extends only to the RAN 104.

SUMMARY

Methods and systems for exposing the network slice selection process to the entities within or attached to a User Equipment (UE) are provided. In some embodiments, the network slice selection process is accessible via one or more Application Programming Interfaces (APIs) within the UE.

According to one aspect of the present disclosure, a method for allowing slice consumers within or attached to a client device operating in a telecommunications network to access and use Network Slice Selection Assistance Information (NSSAI) comprises: at the client device: receiving, at an Application Programming Interface (API) layer within the client device, a query for NSSAI, the query being sent by a slice consumer; sending, to a Fifth Generation (5G) modem within the client device, the query for NSSAI; receiving, from the 5G modem, a response to the query for NSSAI; and sending, to the slice consumer, the response to the query for NSSAI.

In some embodiments, upon receiving the query for NSSAI, the API layer determines whether the query for NSSAI is allowed and sending the query for NSSAI to the 5G modem only when the query for NSSAI is allowed.

In some embodiments, receiving the query for NSSAI comprises receiving the query from a native slice consumer within the client device and wherein sending the response to the query for NSSAI comprises sending a response to the native slice consumer.

In some embodiments, the native slice consumer comprises a browser or a native application.

In some embodiments, receiving the query for NSSAI comprises receiving the query from an external slice consumer attached to the client device and wherein sending the response to the query for NSSAI comprises sending the response to the external slice consumer.

In some embodiments, receiving the query from the external slice consumer attached to the client device comprises receiving the query via a wired interface or a wireless interface of the UE and wherein sending the response to the external slice consumer comprises sending the response via the wired interface or the wireless interface of the UE.

In some embodiments the method further comprises, in response the receiving the query for NSSAI, fetching, by the 5G modem and from a Core Access and Mobility Management Function (AMF), a list of Single NSSAIs (S-NSSAIs) available for the UE from the AMF, wherein sending the response to the query for the NSSAI comprises sending the list of S-NSSAI(s) available for the UE received from the AMF.

In some embodiments, fetching the list of S-NSSAI(s) from the AMF comprises: sending, to the AMF, a request for a list of S-NSSAIs available from the network; and receiving, from the AMF, the list of S-NSSAIs available from the network.

In some embodiments, the method further comprises, at the API layer: receiving, from the slice consumer information identifying at least one S-NSSAI; and sending, to the 5G modem, the information identifying the at least one S-NSSAI.

In some embodiments, receiving the information identifying the at least one S-NSSAI comprises receiving the information identifying the at least one S-NSSAI from a native slice consumer.

In some embodiments, receiving the information identifying the at least one S-NSSAI from a native slice consumer comprises receiving the information from a browser or a native application.

In some embodiments, receiving the information identifying the at least one S-NSSAI comprises receiving the information identifying the at least one S-NSSAI from the external slice consumer.

In some embodiments, receiving the information identifying the at least one S-NSSAI from the external slice consumer comprises receiving the information identifying the at least one S-NSSAI via a wired interface or a wireless interface.

In some embodiments, the method further comprises, at the 5G modem: receiving the information identifying the at least one S-NSSAI; and sending, to the AMF an N1 interface signaling message.

In some embodiments, sending the N1 interface signaling message comprises sending the N1 interface signaling message comprising the information identifying the at least one S-NSSAI.

In some embodiments, sending the N1 interface signaling message comprises sending a Protocol Data Unit (PDU) Session Establishment Request.

In some embodiments, sending the N1 interface signaling message comprises sending a PDU Session Modification Request.

In some embodiments, sending the N1 interface signaling message comprises sending, to the AMF, a request involving a selected S-NSSAI.

In some embodiments, the method further comprises: receiving, from the AMF, a notification that the request was denied; and sending, to an AF a request to subscribe to the selected S-NSSAI.

In some embodiments, wherein receiving, from the AF, an indication that the request to subscribe to the selected S-NSSAI was approved.

In some embodiments, the method further comprises sending, to the AMF, a request involving the selected S-NSSAI and receiving, from the AMF, a notification that the request was allowed.

In some embodiments, the method further comprises: sending, from the slice consumer to the AF, a request for certification of the slice consumer by the network; and receiving, from the AF, a certificate for use by the slice consumer.

In some embodiments, the method further comprises, at the API layer: receiving, from the slice consumer a request to validate the certificate received by the AF; sending, to a Network Exposure Function (NEF), the request to validate the certificate; receiving, from the NEF, notification that the certificate is valid or invalid; and forwarding, to the slice consumer, the received notification that the certificate is valid or invalid.

In some embodiments, the method further comprises: at the AF: receiving, from a UE, the request for certification of the slice consumer by the network; sending, to a slice manager, the request for certification of the slice consumer; receiving, from the slice manager, a certificate for use by the slice consumer; and sending, to the UE, the certificate for use by the slice consumer.

In some embodiments, sending the request to the slice manager comprises sending the request to the slice manager via a NEF, and wherein receiving the certificate from the slice manager comprises receiving the certificate from the slice manager via the NEF.

In some embodiments, the AF comprises an Over-The-Top (OTT) backend server.

In some embodiments, the method further comprises: at the NEF: receiving, from the UE, the request to validate the certificate; sending, to the slice manager, the request to validate the certificate; receiving, from the slice manager, a notification that the certificate is valid or invalid; and sending, to the UE, the notification that the certificate is valid or invalid.

In some embodiments, the slice manager comprises a Unified Data Management (UDM), a Policy Control Function (PCF), a Network Slice Selection Function (NSSF), or a Home Subscriber Server (HSS).

According to another embodiment of the present disclosure, a client device for operating in a telecommunications network and that allows slice consumers within or attached to the client device to access and use NSSAI the client device comprising: a modem for communicating with the telecommunications network; an API layer for providing at least one API by which a network slice consumer may request network slice information or may perform network slice related network functions; one or more processors; and memory storing instructions executable by the one or more processors, whereby the client device is operable to: receive, at the API layer within the client device, a query for NSSAI, the query being sent by a slice consumer; send, to a 5G modem within the client device, the query for NSSAI; receive, from the 5G modem, a response to the query for NSSAI; and send, to the slice consumer, the response to the query for NSSAI.

In some embodiments, the modem for communicating with the telecommunications network comprises a modem for communicating on at least one of a 5G telecommunications network and a Long Term Evolution (LTE) telecommunications network.

In some embodiments, the client device comprises at least one native slice consumer within the client device.

In some embodiments, the at least one native slice consumer comprises a browser or a native application.

In some embodiments, the client device comprises an interface for supporting an external slice consumer.

In some embodiments, the interface for supporting the external slice consumer comprises a wired interface or a wireless interface by which the external slice consumer may communicate with the client device.

In some embodiments, the client device comprises a UE, a fixed wireless access Customer Premises Equipment (CPE), a smart phone, a vehicles connectivity system, a robots/machines connectivity system, connected goggles, Unmanned Aerial Vehicles (UAVs)/drones, airplanes connectivity systems, connected home appliance system, a connected entertainment system, or an Internet of Things (IoT) device.

In some embodiments, the client device is further operable to perform any of the client device methods described herein.

According to another aspect of the present disclosure, a client device for operating in a telecommunications network and that allows slice consumers within or attached to the client device to access and use NSSAI is adapted to: receive, at an API layer within the client device, a query for NSSAI, the query being sent by a slice consumer; send, to a 5G modem within the client device, the query for NSSAI; receive, from the 5G modem, a response to the query for NSSAI; and send, to the slice consumer, the response to the query for NSSAI.

In some embodiments, the client device is further adapted to perform any of the client device methods described herein.

According to another aspect of the present disclosure, a client device for operating in a telecommunications network and that allows slice consumers within or attached to the client device to access and use NSSAI comprises: means for receiving, at an API layer within the client device, a query for NSSAI, the query being sent by a slice consumer; means for sending, to a 5G modem within the client device, the query for NSSAI; means for receiving, from the 5G modem, a response to the query for NSSAI; and means for sending, to the slice consumer, the response to the query for NSSAI.

In some embodiments, the client device is further comprises means for performing any of the client device methods described herein.

According to another aspect of the present disclosure, a client device for operating in a telecommunications network and that allows slice consumers within or attached to the client device to access and use NSSAI the client device comprising one or more modules, the modules operable to: receive, at an API layer within the client device, a query for NSSAI, the query being sent by a slice consumer; send, to a 5G modem within the client device, the query for NSSAI; receive, from the 5G modem, a response to the query for NSSAI; and send, to the slice consumer, the response to the query for NSSAI.

In some embodiments, the one or more modules are further operable to perform any of the client device methods described herein.

According to another aspect of the present disclosure, a non-transitory computer readable medium storing software instructions that when executed by one or more processors of a client device that allows slice consumers within or attached to the client device to access and use NSSAI cause the client device to: receive, at an API layer within the client device, a query for NSSAI, the query being sent by a slice consumer; send, to a 5G modem within the client device, the query for NSSAI; receive, from the 5G modem, a response to the query for NSSAI; and send, to the slice consumer, the response to the query for NSSAI.

In some embodiments, the non-transitory computer readable medium stores software instructions that when executed by one or more processors of a client device further cause the client device to perform any of the client device methods described herein.

According to another aspect of the present disclosure, a computer program comprises instructions which, when executed by at least one processor, cause the at least one processor to carry out any of the client device methods described herein.

According to another aspect of the present disclosure, a method for allowing slice consumers within or attached to a client device operating in a telecommunications network to access and use NSSAI the method comprising: at a AMF: receiving, from a client device, a first request involving network slices; and sending, to the client device, a response to the first request involving network slices.

In some embodiments, the method further comprises: in response to receiving the first request involving network slices, sending, to a slice manager, a second request involving network slices; receiving, from the slice manager, a response to the second request involving network slices; and sending the response to the first request involving network slices in response to receiving the response to the second request involving network slices from the slice manager.

In some embodiments, the first request comprises a request for a list of S-NSSAIs available to the client device from the network; the second request comprises a Nudm_SDM_Get Request for slice selection subscription data; the response to the second request comprises a list of S-NSSAIs available to the client device from the network; and the response to the first request comprises the list of S-NSSAIs available to the client device from the network.

In some embodiments, the first request comprises a request for a selected S-NSSAI; the second request comprises a query to determine if the selected S-NSSAI is allowed; the response to the second request comprises a notification that the selected S-NSSAI was allowed or not allowed; and the response to the first request comprises a notification that the first request was allowed or denied.

In some embodiments, the first request comprises a PDU Session Modification Request comprising information that identifies a S-NSSAI selected by the slice consumer within or connected to the client device.

According to another aspect of the present disclosure, an AMF that allows slice consumers within or attached to a client device operating in a telecommunications network to access and use NSSAI comprises: one or more processors; and memory storing instructions executable by the one or more processors, whereby the AMF is operable to perform any of the AMF methods described herein.

According to another aspect of the present disclosure, an AMF that allows slice consumers within or attached to a client device operating in a telecommunications network to access and use NSSAI is adapted to perform any of the AMF methods described herein.

According to another aspect of the present disclosure, an AMF that allows slice consumers within or attached to a client device operating in a telecommunications network to access and use NSSAI comprises means for performing any of the AMF methods described herein.

According to another aspect of the present disclosure, an AMF that allows slice consumers within or attached to a client device operating in a telecommunications network to access and use NSSAI comprises one or more modules, the modules operable to perform any of the AMF methods described herein.

According to another aspect of the present disclosure, a non-transitory computer readable medium stores software instructions that when executed by one or more processors of a AMF cause the AMF perform any of the AMF methods described herein.

According to another aspect of the present disclosure, a computer program comprises instructions which, when executed by at least one processor, cause the at least one processor to carry out any of the AMF methods described herein.

According to another aspect of the present disclosure, a method for allowing slice consumers within or attached to a client device operating in a telecommunications network to access and use NSSAI comprises: at an AF: receiving, from a slice consumer within or connected to the client device, a first request involving network slices; and sending, to the client device, a response to the first request involving network slices.

In some embodiments, the first request comprises a request to subscribe to a selected S-NSSAI and wherein the method further comprises: sending, to a slice manager, the request to subscribe to the S-NSSAI; and receiving, from the slice manager, a response to the request to subscribe to the S-NSSAI; wherein the response to the first request comprises the response to the request to subscribe to the S-NSSAI.

In some embodiments, the first request comprises a request to certify the slice consumer with the network and wherein the method further comprises: sending, to the slice manager, the request to certify the slice consumer with the network; and receiving, from the slice manager, a response to the request to certify the slice consumer with the network; wherein the response to the first request comprises the response to the request to certify the slice consumer with the network.

In some embodiments, sending the request to certify the slice consumer with the network comprises sending the request to the slice manager via a NEF, and wherein receiving the response to the request to certify the slice consumer with the network comprises receiving the response from the slice manager via the NEF.

In some embodiments, the slice manager comprises a UDM node, a PCF, a NSSF, or a HSS.

In some embodiments, the AF comprises an OTT backend server.

According to another aspect of the present disclosure, an AF that allows slice consumers within or attached to a client device operating in a telecommunications network to access and use NSSAI comprises: one or more processors; and memory storing instructions executable by the one or more processors, whereby the AF is operable to perform any of the AF methods described herein.

According to another aspect of the present disclosure, an AF that allows slice consumers within or attached to a client device operating in a telecommunications network to access and use NSSAI is adapted to perform any of the AF methods described herein.

According to another aspect of the present disclosure, an AF that allows slice consumers within or attached to a client device operating in a telecommunications network to access and use NSSAI comprises a means for performing any of the AF methods described herein.

According to another aspect of the present disclosure, an AF that allows slice consumers within or attached to a client device operating in a telecommunications network to access and use NSSAI comprises one or more modules, the modules operable to perform any of the AF methods described herein.

According to another aspect of the present disclosure, a non-transitory computer readable medium stores software instructions that when executed by one or more processors of an AF cause the AF to perform any of the AF methods described herein.

According to another aspect of the present disclosure, a computer program comprises instructions which, when executed by at least one processor, cause the at least one processor to carry out the method of the non-transitory computer readable medium described above.

According to another aspect of the present disclosure, a method for allowing slice consumers within or attached to a client device operating in a telecommunications network to access and use NSSAI comprises: at a NEF: receiving a first request involving network slices; and sending a response to the first request involving network slices.

In some embodiments, receiving a first request involving network slices comprises receiving, from an AF, a request to subscribe a slice consumer within or connected to a client device to a S-NSSAI and wherein the method further comprises: sending the request to subscribe the slice consumer to the S-NSSAI to a slice manager; and receiving, from the slice manager, a response to the request to subscribe the slice consumer to the S-NSSAI; wherein sending a response to the first request involving network slices comprises forwarding, to the AF, the response to the request to subscribe the slice consumer to the S-NSSAI.

In some embodiments, receiving the first request involving network slices comprises receiving, from an AF, a request for certification of a slice consumer by the network and wherein the method further comprises: sending the request for certification to a slice manager; and receiving, from the slice manager, a response to the request for certification; wherein sending the response to the first request involving network slices comprises sending, to the AF, the response to the request for certification.

In some embodiments, the response to request for certification comprises a certificate for use by the slice consumer and wherein sending the response to the request for certification comprises sending the certificate for use by the slice consumer to the AF.

In some embodiments, receiving a first request involving network slices comprises receiving, from an API layer, a request to validate a certificate for use by a slice consumer and wherein the method further comprises: sending the request to validate the certificate to a slice manager; and receiving, from the slice manager, a response to the request to validate the certificate; wherein sending the response to the first request involving network slices comprises sending, to the API layer, the response to the request to validate the certificate.

In some embodiments, the slice manager comprises a UDM node, a PCF, a NSSF, or a HSS.

According to another aspect of the present disclosure, a NEF that allows slice consumers within or attached to a client device operating in a telecommunications network to access and use NSSAI comprises: one or more processors; and memory storing instructions executable by the one or more processors, whereby the NEF is operable to perform any of the NEF methods described herein.

According to another aspect of the present disclosure, a NEF that allows slice consumers within or attached to a client device operating in a telecommunications network to access and use NSSAI the NEF being adapted to perform any of the NEF methods described herein.

According to another aspect of the present disclosure, a NEF that allows slice consumers within or attached to a client device operating in a telecommunications network to access and use NSSAI comprises means for performing any of the NEF methods described herein.

According to another aspect of the present disclosure, a NEF that allows slice consumers within or attached to a client device operating in a telecommunications network to access and use NSSAI comprises one or more modules, the modules operable to perform any of the NEF methods described herein.

According to another aspect of the present disclosure, a non-transitory computer readable medium stores software instructions that when executed by one or more processors of a NEF causes the NEF to perform any of the NEF methods described herein.

According to another aspect of the present disclosure, a computer program comprises instructions which, when executed by at least one processor, cause the at least one processor to carry out any of the NEF methods described here.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 20 is a flowchart illustrating a method implemented in a communication system in accordance with some embodiments on the present disclosure; and FIG. 21 is a flowchart illustrating a method implemented in a communication system in accordance with some embodiments of the present disclosure.

DETAILED DESCRIPTION

Figure 1:
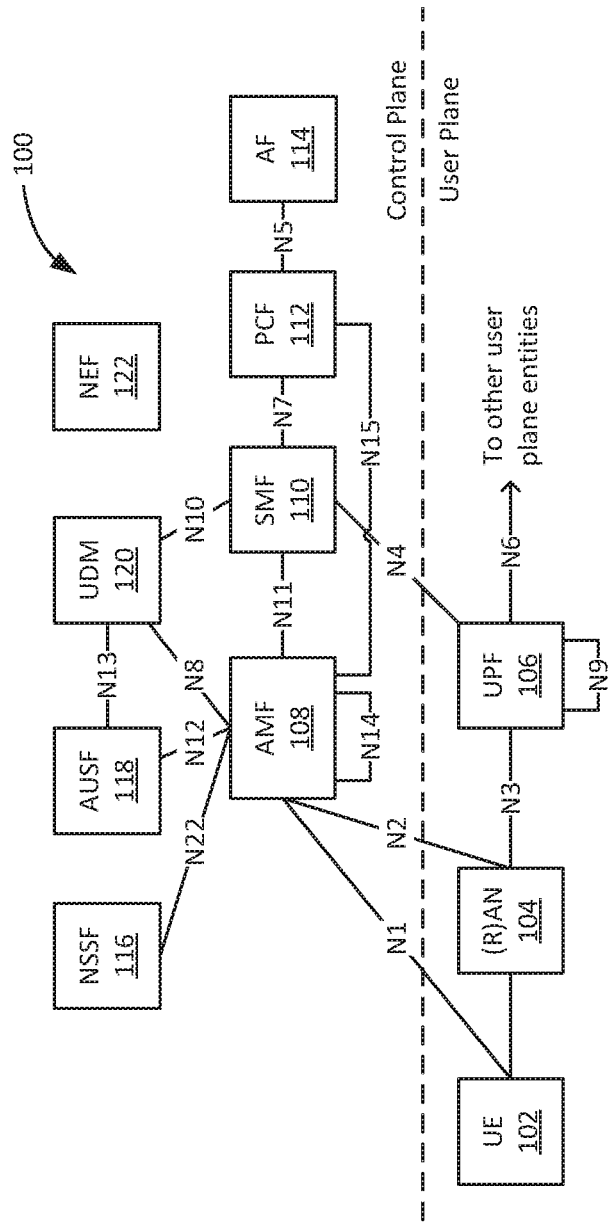
FIG. 1 illustrates a conventional Fifth Generation (5G) telecommunications network in which a User Equipment (UE) may operate.
Figure 2:
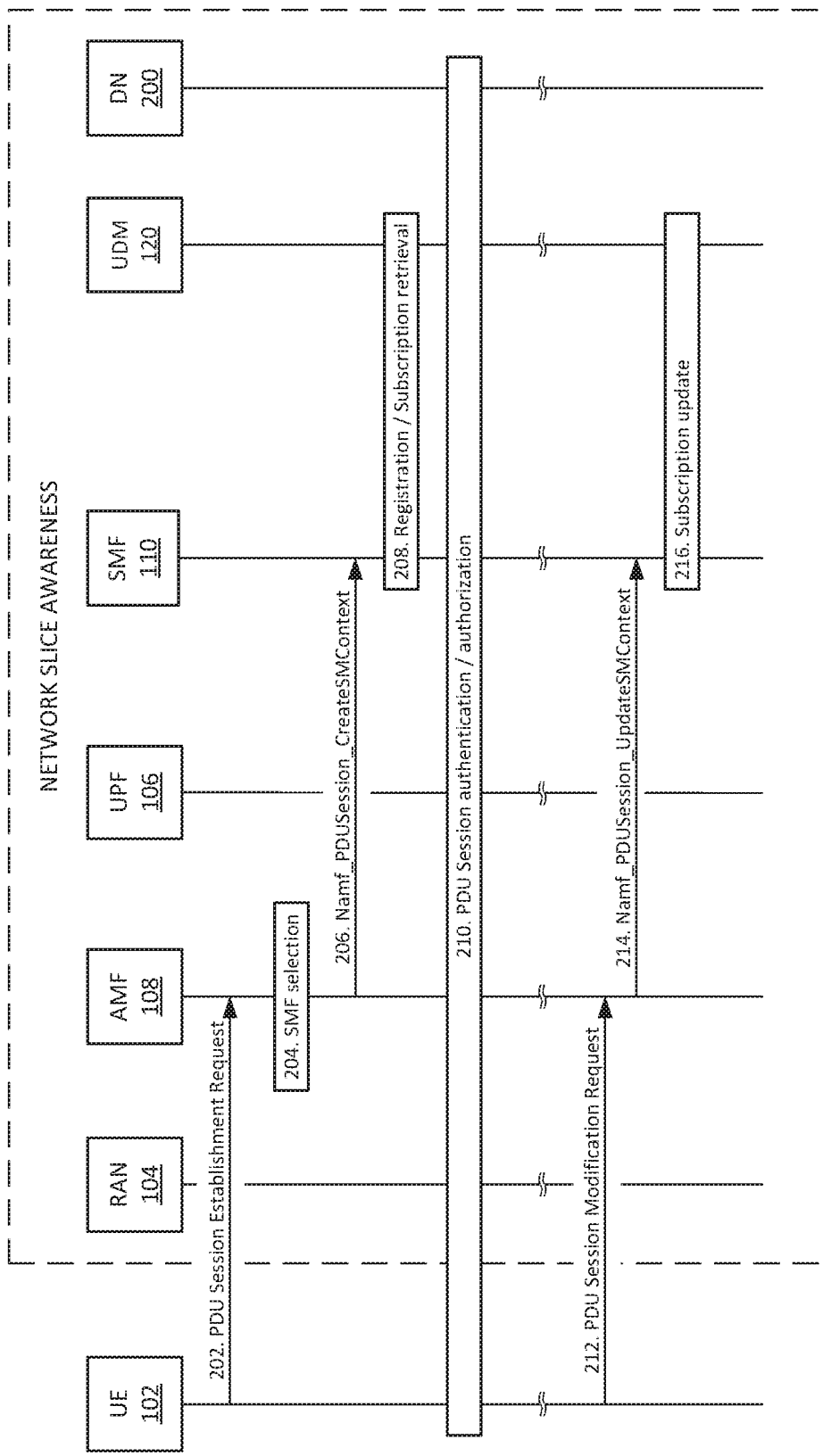
FIG. 2 is a signaling message diagram illustrating a portion of a conventional process by which a UE establishes a Protocol Data Unit (PDU) Session with a Data Network (DN)

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Terms and Definitions

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network, a Machine Type Communication (MTC) device, and a wired/wireless Customer Premises Equipment (CPE).

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

As described above, previous technologies didn't provide the flexibility being introduced in 5G Core/NR that would allow the use of network slices, identified by Network Slice Selection Assistance Information (NSSAIs) serving the same UE. In 5G, the delivery of network slices happens automatically based on information exchanged between the UE and the 5G NR/CORE, which is very different mechanism from that used in LTE networks in which it was necessary to predefine Quality of Service (QoS) Class Identifiers (QCIs), each QCI having fixed QoS parameters tied to a dedicated type of service.

Thus, one disadvantage to the current 5G implementation is that there is currently no mechanism to expose these 5G QoS values (called Single NSSAIs (S-NSSAIs)) to applications within the UE, herein referred to as "native applications," or to applications running on devices connected to the UE, herein referred to as "external applications." As used herein, an application may also be referred to as an "app." Examples of native applications include, but are limited to, online services applications, such as Facebook, Google, Amazon, Netflix, etc., and browsers, such as Safari. Examples of external applications include, but are not limited to, applications running on external devices such as smart watches, health monitoring devices, games consoles, entertainment solutions, smart televisions, personal assistants, etc., that are connected to the UE via a wired or wireless connection.

Enhanced UE

Figure 3:
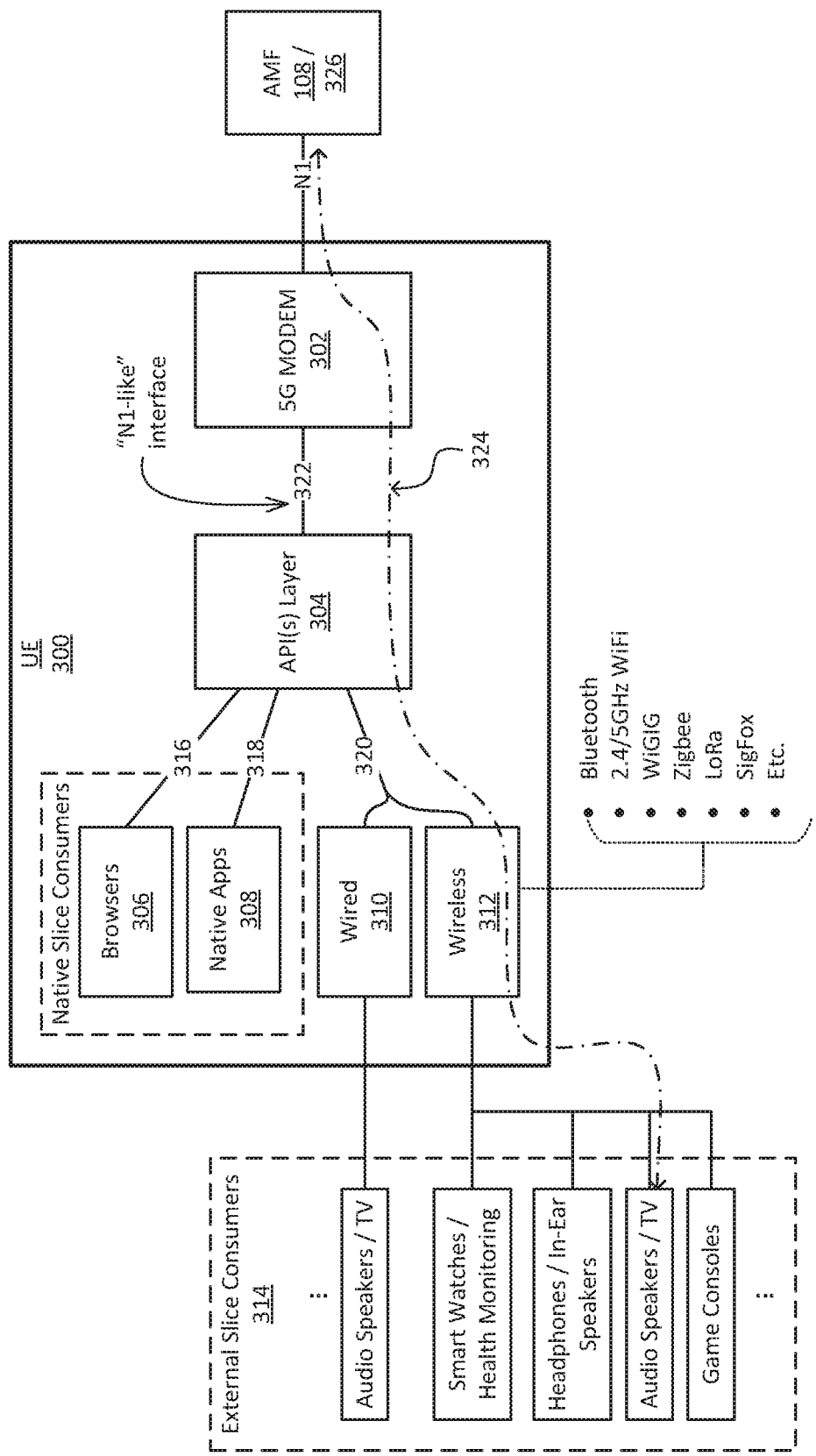
FIG. 3 illustrates an example of a User Equipment (UE) capable of requesting appropriate Network Slice Selection Assistance Information (NSSAI) from a 5G network according to some embodiments of the present disclosure.

FIG. 3 illustrates an example of a UE or CPE capable of requesting appropriate NSSAI from a 5G network according to some embodiments of the present disclosure. The following description will use the term UE but it will be understood that the same principles may apply to a CPE or other similar equipment.

Modem. In the embodiment illustrated in FIG. 3, UE 300 communicates with a Core Access and Mobility Management Function (AMF) 108 via the N1 interface, which is attached to a 5G modem 302.

Application Programming Interface (API) Layer. The UE 300 also includes one or more APIs, which, in the embodiment illustrated in FIG. 3, are located in an API Layer 304.

Slice consumers. In the embodiment illustrated in FIG. 3, the API Layer 304 provides APIs to entities that may request to use network slices, referred to generically as "slice consumers." Example slice consumers include internal applications or programs, such as a browser 306 or other native applications 308, as well as devices external to the UE 300 but attached to the UE 300 via a wired interface 310 or a wireless interface 312. Slice consumers within the UE 300 may also be referred to as "native slice consumers" and slice consumers external to the UE 300 may also be referred to as "external slice consumers 314."

For example, the UE 300 may have a wired connection to audio speakers, a television, or other appliance. Likewise, the UE 300 may be connected wirelessly to different kinds of devices, including smart watches or health monitoring devices, audio speakers, a television, headphones or in-ear speakers, game consoles, etc. These examples are illustrative and not limiting. In some embodiments, the wireless interface 312 may support one or more wireless protocols, including but not limited to Bluetooth, 2.4/5 Gigahertz (GHz) WiFi, WiGIG, Zigbee, Long Range (LoRa) radio, SigFox, or any type of low power type of wireless communication, etc. In this manner, external devices may be connected to the 5G network through the UE 300, via cable, wire, or wireless link to the UE 300, e.g., the UE 300 operates as a "hub."

In the embodiment illustrated in FIG. 3, both the wired interface 310 and wireless interface 312 are allowed access to the APIs provided by the API Layer 304. In this manner, not only can internal devices have the capability to perform NSSAI-related functions such as requesting information about S-NSSAIs, selecting S-NSSAIs, etc., but external device can also have such capabilities.

In some embodiments, the API layer 304 is middleware that resides on the UE 300 and is conceptually located between the 5G modem 302 and slice consumers. In some embodiments, the API layer 304 may perform multiple functions, including but not limited to the following:

Exposing current and future 5G, N1 interface, capabilities to the slice consumers. This allows browsers and native applications, as well as external devices, to discover the capabilities of the network slices that are allowed for that UE. Having that knowledge allows the slice consumer to make informed decisions about what slices to request.

Allowing a slice consumer to proactively request a slice or a slice having a particular characteristic, whether or not the slice consumer is aware of the capabilities of the allowed network slices. In this manner, a slice consumer may request a particular network slice that it knows to be allowed for that UE, or the slice consumer may make a request for a slice having a particular characteristic, and the API layer 304 will attempt to identify an appropriate network slice and request that slice on behalf of that UE.

Mapping industry-specific terms to NSSAI language, such that the slice consumer may make requests in terms of QoS, in terms of S-NSSAIs, or both. In some embodiments, the allowed slices information provided by the API layer 304 and/or 5G modem 302 may contain the details of the slice parameters. In some embodiments, there may be a previous agreement between the slice consumers and the Mobile Network Operator (MNO) or Mobile Virtual Network Operator (MVNO) regarding the establishment of slices identification and authorization. In some embodiments, there may be standardized network slices that could be understood by all entities within the ecosystem, such as "enhanced Mobile Broadband" (eMBB), "enhanced Machine Type Communication" (eMTC), "Ultra-Reliable Low-Latency Communication" (URLLC), and others. This allows a slice consumer to successfully request a slice whether or not the slice consumer is "NSSAI-literate."

Providing Authentication/Authorization/Access (AAA) functions to the API consumers, e.g., via certificates/tokens previously authorized by the 5G Core.

In some embodiments, where slice consumers are requesting a dedicated Protocol Data Unit (PDU) session, the network slices can be consumed without previous minimum QoS validation. In some embodiments, where there is a common PDU session being used by multiple slice consumers, each of those multiple slice consumers will be allowed only request a network slice that provides an upgraded QoS, e.g., network slice requests that degrade QoS of the shared PDU session will be denied, so that the shared PDU session will also accommodate the needs of the other slice consumers.

Interfaces

In some embodiments, the network slice selection process may be exposed to the native and external applications through the API layer 304 via the creation or modification of interfaces within the UE architecture. In the embodiment illustrated in FIG. 1, a new interface 316 is defined between browsers 306 and the API layer 304; a new interface 318 is defined by between non-browser native apps 308 and the API layer 304; and a new interface 320 is defined between external devices that are connected to the UE 300 via the wired interface 310 or the wireless interface 312.

In some embodiments, new interface 316 comprises a Representational State Transfer (REST) API to be used inside the UE 300 call flows when a browser needs to query and select allowed NSSAIs.

In some embodiments, new interface 318 comprises a REST API to be used inside the UE 300 call flows when a native application needs to query and select allowed NSSAIs.

In some embodiments, new interface 320 comprises a REST API to be used inside the UE 300 call flows when an external application needs to query and select allowed NSSAIs. In some embodiments, the wired interface 310 and the wireless interface 312 are modified to allow external devices to communicate with the API layers 304.

In some embodiments, the interface 322 between the API layer 304 and the 5G modem 302 is modified to allow native and external browsers or other applications to specify NSSAI values requirements to be included within N1 messages when triggering a request for an NSSAI. For this reason, modified interface 322 may be referred to as being "N1-like," in that it is capable of exposing 5G capabilities to entities within the UE 300 and entities external to but connected to the UE 300. The N1 interface between a UE and an AMF as defined in the 5G standards already has the capability to allow UEs to select S-NSSAI(s), and thus can also support having internal and external UE applications making similar requests.

The new or modified interfaces described above allow the 5G modem 302, which oversees the N1 interface with AMF 108 containing the NSSAI parameter, to expose the allowed NSSAI values to the API layer 304, which could further expose those values for potential use by native and external applications. As an example, in the embodiment illustrated in FIG. 3, the UE 300 may be wirelessly connected to a display device, such as a television, which is mirroring the screen of the UE 300 (e.g., the user is streaming a movie through his or her mobile phone and using the television as the display device). The dashed line 324 represents a communication path by which the external display device may establish—or later modify—a network slice having appropriate characteristics (e.g., throughput sufficient to support a particular screen resolution, etc.)

Although FIG. 1 illustrates a UE 300 having this capability, the same concepts may be applied to other types of devices, including, but not limited to, automobiles, Unmanned Aerial Vehicles (UAVs), airplanes, robots, machinery, appliances, vehicles, or any other entity that contains a 5G modem and that may be capable of (or would benefit from) selecting network slices via the N1 interface. Any such devices—not just UEs—may support exposing S-NSSAI communicated via the N1 interface for consumption by native or external applications according to embodiments of the present disclosure. Such devices can query allowed S-NSSAIs, request allowed 5-NSSAIs, and/or request the subscription to new S-NSSAIs. For simplicity of description, however, the term "UE" will hereinafter be used to represent any device having the capabilities described in the present disclosure.

Enhanced UE 300 provides several benefits over conventional UEs. For example, both native applications and external applications have the advantage that they have first-hand knowledge of when there is a need to change the QoS for a specific PDU session. Some illustrative examples include, but are not limited to, the following:

A user may change QoS requirements explicitly with actions such as:
  The user watching a video on a native or external application or browser explicitly changes the resolution of the video (e.g., by choosing, 144p, 240p, 360p, 480p, 720p, 1080p, 4K, 8K, etc.), which affects the required bandwidth and/or throughput or even the Content Delivery Network (CDN) server physical location; and
  The user watching a video or listening to an audio book on any type of native or external application or browser explicitly changes the playback speed of the media content.

A user can change QoS requirements implicitly with actions such as:
  The user starts a Multiplayer, Real Time Game (MRTG) that requires super low latency;
  The user starts an Augmented Reality (AR) application that requires super low latency (some researches show that <5 ms round trip may be required in certain use cases);
  The user starts an tactile Internet action that requires super low latency for haptic feedback (some researches show that <10 ms round trip may be required in certain use cases); and
  The user changes a display from portrait mode to landscape mode or vice versa, which may implicitly change the resolution of the video.

In the examples above, a native application or an external application is aware that the QoS for a specific PDU session will need to change. The UE 300 provides a mechanism by which the native or external application can actively request a change of QoS for an existing PDU session. The same principles apply to creation of a new PDU session, i.e., the native or external application has first-hand knowledge of what level of QoS will be needed for a new PDU session. The UE 300 provides a mechanism by which the native or external application can specify the initial QoS value for a new PDU session that is being requested.

It should be noted that some of the enhanced features of UE 300 do not require any modification to the existing N1 interface, but instead reuse current conventional N1 capabilities, with the caveat that the conventional messages sent over the N1 interface now take into account the information provided to the API layer via the new interfaces. For example, in some embodiments, messages sent by the 5G modem 302 to the AMF 108 via the N1 interface may include the NSSAI values requested by the native or external browsers or applications.

In other embodiments, the existing N1 interface may be enhanced. For example, in some embodiments, the existing N1 interface may be extended to allow the API layer 304 to be synchronized with 5G core systems on which native and external applications are authorized to participate in the NSSAI establishment process. In some embodiments, the existing N1 layer may be extended so as to provide the 5G modem 302 with details of the network slice parameters.

Enhanced AMF

In embodiments where the N1 layer is modified or enhanced, then the network may include an enhanced AMF 324 that supports the enhanced N1 layer functionality. Such enhancements supported by the enhanced AMF 324 include, but are not limited to: the possibility for 5G Modems and N1 consumers to request registration to existing NSSAIs (e.g., association to allowed NSSAIs); the possibility for 5G Modems and N1 consumers to request the creation of new NSSAIs; and the possibility to extend certain functions from N2 to N1, such as handover required request. Examples of all of these scenarios are illustrated in FIGS. 4 through 7.

Call Flows

The methods and systems provided herein may influence existing call flows described in 3GPP TS 23.502 as detailed below:

Registration Procedure. No changes: the UE 300 will register with the NSSAI values coming from the 5G modem 302.

Registration with AMF reselection. No changes: the UE 300 will register with the NSSAI values coming from the 5G modem 302.

UE-requested PDU Session Establishment for non-roaming and roaming with local breakout. During the PDU session Establishment the UE 300 could send the NSSAI values requested by a browser 306 or native application 308. As defined in the call flow, the serving AMF 106/324 has discretionary decision to reject NSSAI requested and deliver the allowed/supported NSSAI.

UE-requested PDU Session Establishment for home-routed roaming scenarios. During the PDU session Establishment the UE 300 could send the NSSAI values requested by a browser 306 or native application 308. As defined in the call flow, the serving AMF 106/324 has discretionary decision to reject NSSAI requested and deliver the allowed/supported NSSAI.

UE or network requested PDU Session modification for non-roaming and roaming with local breakout. The slice consumer can proactively or reactively modify an existing PDU session, or at least provide information with which the UE 300 may make an informed request for modification of the existing PDU session.

UE or network requested PDU Session modification for home-routed roaming scenario. The slice consumer can proactively or reactively modify an existing PDU session, or at least provide information with which the UE 300 may make an informed request for modification of the existing PDU session.

The enhanced call flows described above provide a valuable capability—namely, to allow both native and external slice consumers to create a PDU session with QoS characteristics that are appropriate to the anticipated need of the slice consumer and also to modify an existing PDU session in response to a current or anticipated change of QoS requirements.

Figure 4:
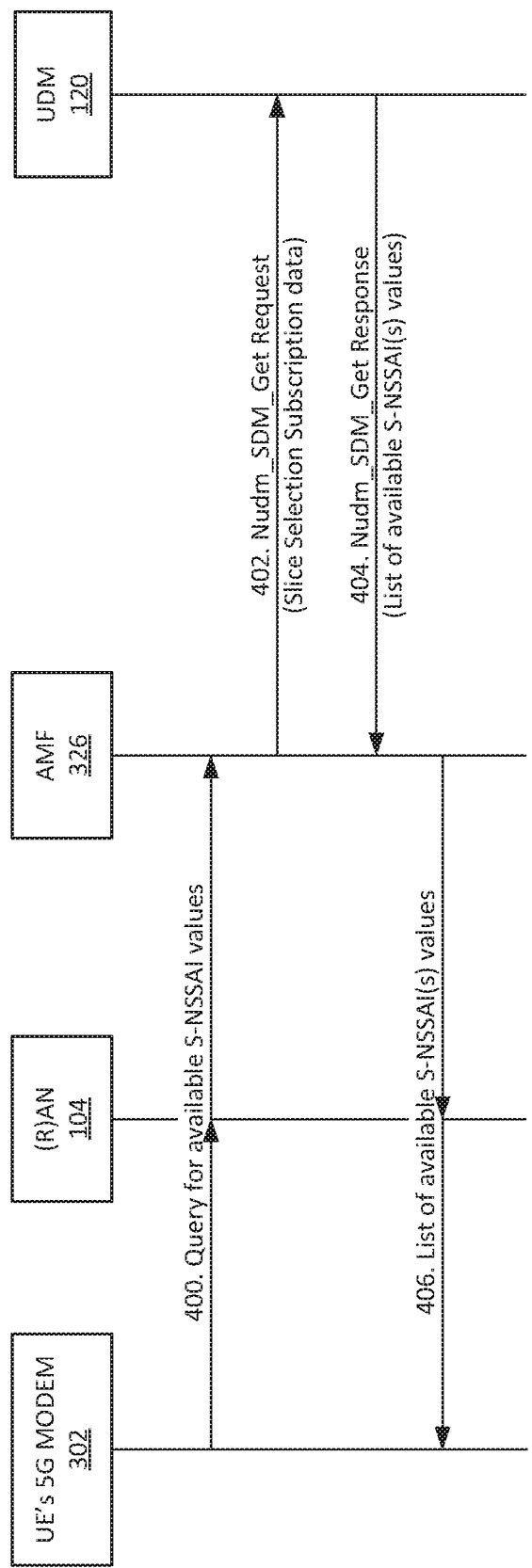
FIG. 4 illustrates an example of signaling message by which a UE may query a Core Access and Mobility Management Function (AMF) for a list of Single NSSAI (S-NSSAI) values that are available to the UE from the network according to some embodiments of the present disclosure.

FIG. 4 illustrates an example of signaling messages by which a UE may query an AMF for a list of S-NSSAI values that are available to the UE from the network according to some embodiments of the present disclosure. FIG. 4 illustrates a new procedure that allows a 5G modem 302 to trigger an AMF 326 process to determine what S-NSSAI values are available from the network and to pass to the 5G modem 302 a list of the available S-NSSAI values.

At step 400, the UE's 5G modem 302 sends a message over the N1 interface to the AMF 326 via the (R)AN 104. In the embodiment illustrated in FIG. 4, this message comprises a query for available S-NSSAI values.

At step 402, the AMF 326 responds to the query by requesting available slice information from a network node that manages slice information (herein referred to as a "slice information manager" or "slice manager." In the embodiment illustrated in FIG. 4, the slice manager is a Unified Data Management node (UDM) 120 and the message is a Nudm_SDM_Get (Slice Selection Subscription Data) message. In alternative embodiments, this function may be performed by other operator network nodes, such as a Policy Control Function (PCF), Home Subscriber Server (HSS), or other database node.

At step 404, the UDM 120 responds by sending to the AMF 326 a list of available S-NSSAI values.

At step 406, the AMF 326 forwards the list of available S-NSSAI values to the 5G modem 302 via the (R)AN 104.

This process allows a UE 300 to find out what S-NSSAI(s) are available from the network, either in response to request from a slice consumer within or connected to the UE 300, or requested by the UE 300 (or by the 5G modem 302) in advance, e.g., before there is a particular need from a slice consumer. In contrast, in conventional networks, which do not have this capability, the UE 300 is forced to try blindly request different S-NSSAIs until it finds one that is allowed. In the following figures, this process of getting a list of available S-NSSAI values is shown as an optional step, reflecting the point that this process may be performed in response to a particular need or it may have been previously performed and the list of values saved by the 5G modem 302.

Figure 5:
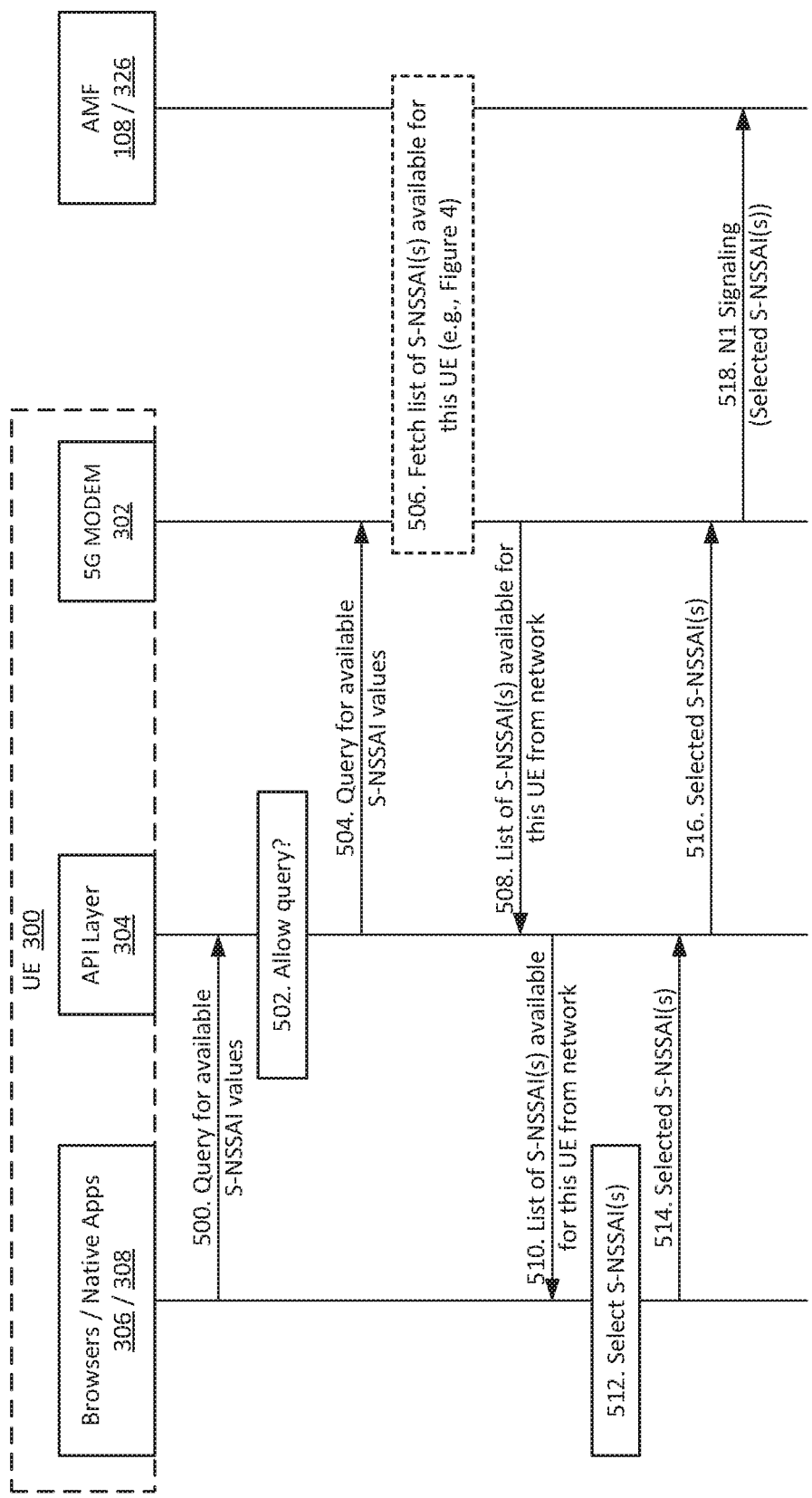
FIG. 5 illustrates an example of signaling messages by which an entity within the UE may request at least one Single NSSAI (S-NSSAI) according to some embodiments of the present disclosure.

FIG. 5 illustrates the scenario in which the native slice consumer seeks to establish a new PDU session or modify an existing PDU session.

At step 500, the native slice consumer, which may be a browser 306 or other native application 308, sends to the API Layer 304 a query requesting a list of available S-NSSAI values.

At step 502, the API layer 304 first determines whether or not to allow the query. In the embodiment illustrated in FIG. 5, the query is allowed. In alternative embodiments, the query may be denied. In some embodiments, this step may be omitted entirely, i.e., the API layer 304 may always accept such queries.

At step 504, the API layer 304 forwards the query to the 5G modem 302.

At optional step 506, if the 5G modem 302 does not already have a list of available S-NSSAI values (or wants to ensure that the list that it does have is up to date), the 5G modem 302 fetches the list of S-NSSAI(s) available for this UE 300, e.g., by performing the steps illustrated in FIG. 4. This step may be skipped, e.g., if the 5G modem 302 already possesses the list of available S-NSSAI values.

At step 508, the 5G modem 302 forwards the list of available S-NSSAIs to the native slice consumer via the API layer 304.

At step 510, the native slice consumer selects one or more S-NSSAI(s) from the list of available S-NSSAI values.

At step 512, the slice consumer sends a request for the selected S-NSSAI(s) to the 5G modem 302 via the API layer 304.

At step 518 the 5G modem 302 sends to the AMF 108/326 an N1 signal that includes information identifying the S-NSSAI(s) selected by the slice consumer.

Figure 6:
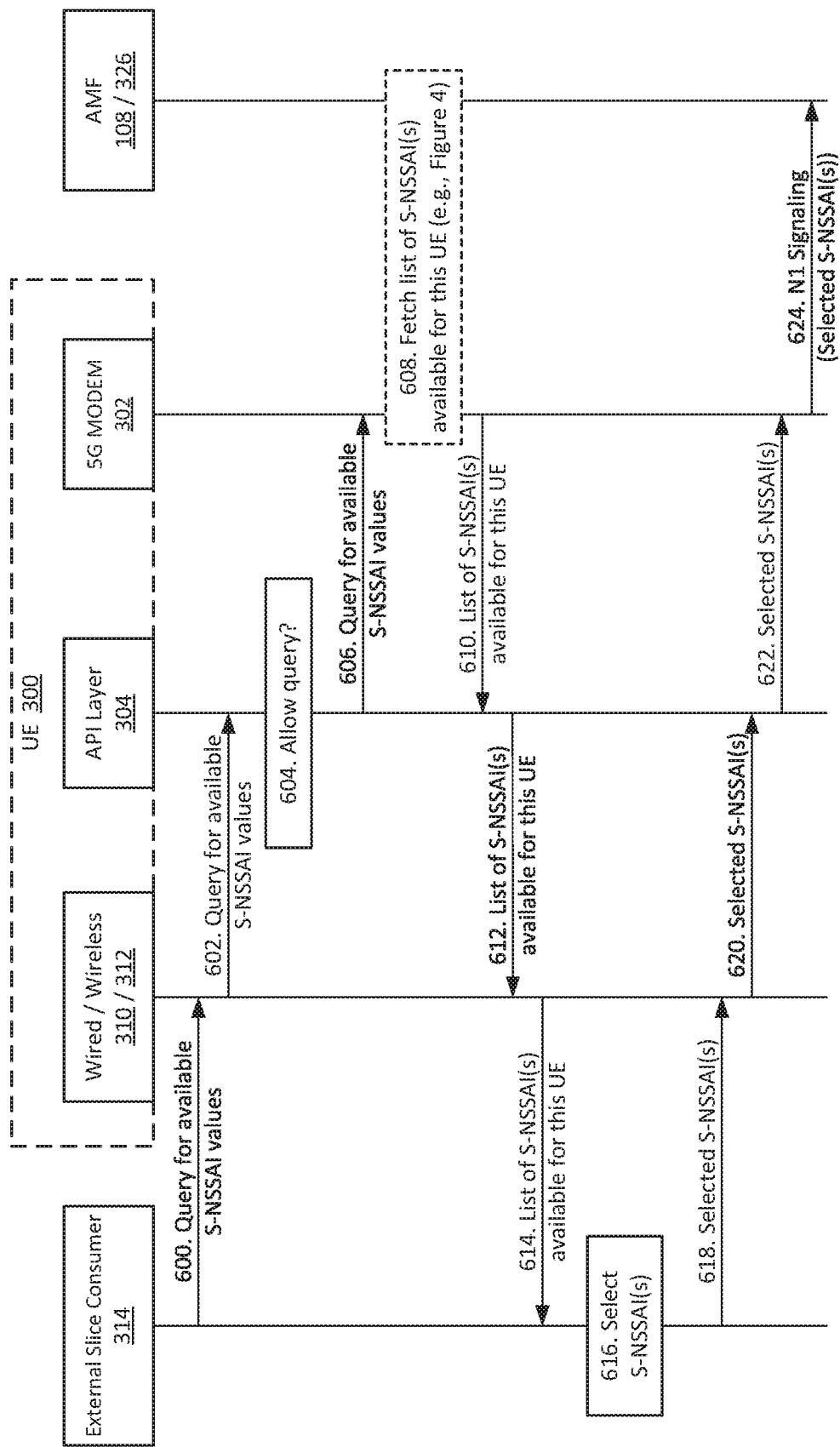
FIG. 6 illustrates an example of signaling messages by which an entity external to the UE but connected to the UE may request at least one S-NSSAI according to some embodiments of the present disclosure.

FIG. 6 illustrates an example of signaling messages by which an entity external to the UE but connected to the UE, herein referred to as "an external slice consumer," may request NSSAI according to some embodiments of the present disclosure. FIG. 6 illustrates the scenario in which an external slice consumer 314 seeks to establish a new PDU session or modify an existing PDU session.

At step 600, the external slice consumer 314 sends to the UE 300 a query requesting a list of available S-NSSAI values (message 500), which is received via the wired interface 310 or the wireless interface 312.

At step 602, the query is forwarded to the API layer 304

At step 604, the API layer 304 determinates whether or not to allow the query from the external slice consumer 314 to be forwarded to the API layer 304. In the embodiment illustrated in FIG. 6, the query is allowed. In an alternative embodiment the query may be denied. In some embodiments this step may be omitted entirely, i.e., the API layer 304 may always accept such queries from external slice consumers.

At step 606, the API layer 304 forwards the query to the 5G modem 302.

At optional step 608, the 5G modem 302 fetches the list of S-NSSAI(s) available for this UE 300, e.g., by performing the steps illustrated in FIG. 4.

At step 610, the 5G modem 302 forwards the list of available S-NSSAIs to the wired interface 310 or the wireless interface 312.

At step 612 the list of available S-NSSAIs is forwarded to the external slice consumer 3143.

At step 614, the external slice consumer 314 selects one or more S-NSSAI(s).

At step 616, the external slice consumer 314 sends to the UE 120 a request for the selected S-NSSAI(s).

At step 618, the request is forwarded through the API layer 304 to the 5G modem 302.

At step 620, the 5G modem 302 sends to the AMF 108/326 an N1 signal that includes information identifying the S-NSSAI(s) selected by the slice consumer.

Figure 7:
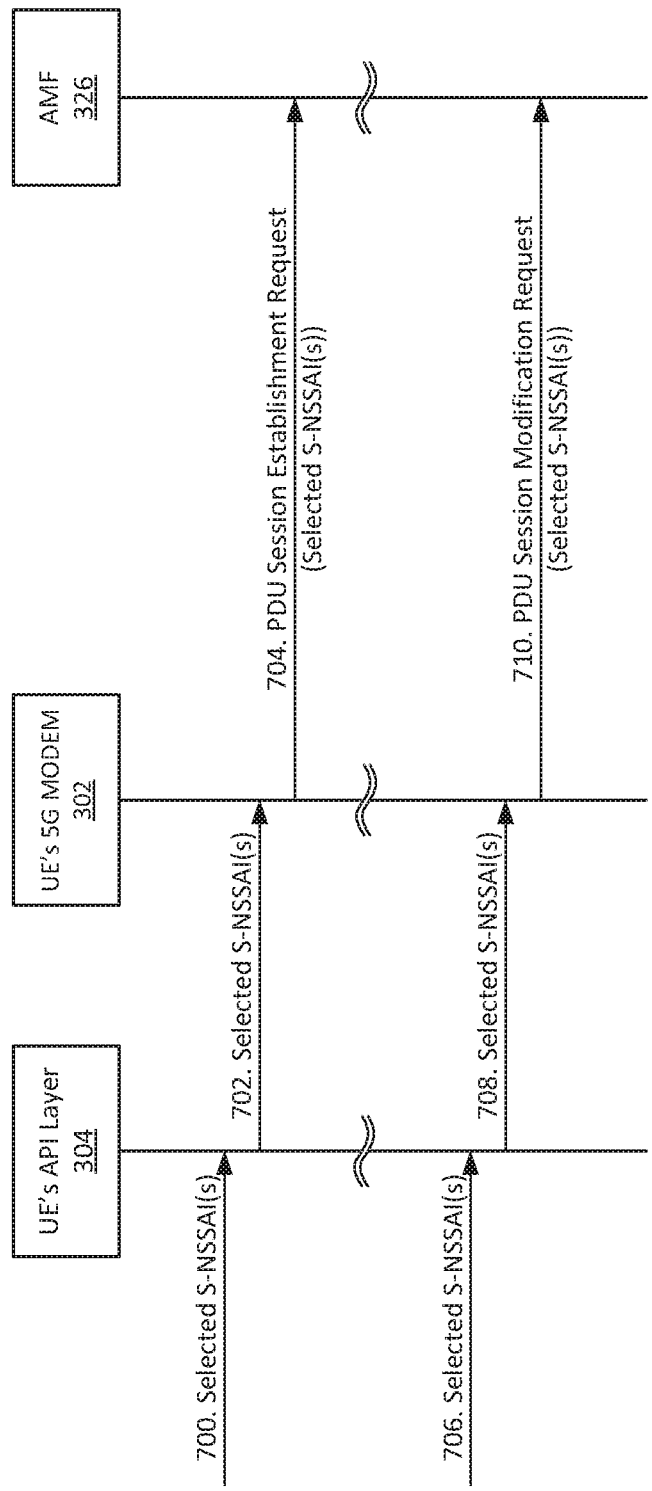
FIG. 7 illustrates an example of signaling messages by which an slice consumer within or connected to the UE may establish or modify a PDU session of the UE according to some embodiments of the present disclosure.

FIG. 7 illustrates two examples of N1 signaling that includes information identifying the S-NSSAI(s) selected by a native or external slice consumer. The first example is request to establish a PDU session and the second example is a request to modify an existing PDU session.

At step 700, the API layer 304 receives, from a native or external slice consumer that desires to establish a PDU session, a signal that identifies at least one S-NSSAI, e.g., S-NSSAI(s) selected by the slice consumer.

At step 702, the API layer 304 forwards the information to the 5G modem 302.

At step 704, the 5G modem 302 uses conventional N1 signaling, e.g., a PDU Session Establishment Request, that contains information that identifies the S-NSSAI(s) selected by the slice consumer. In an alternative embodiment, the API layer 304 or the 5G modem 302, rather than a slice consumer, may select the S-NSSAI(s).

At step 706, the API layer 304 receives, from a slice consumer that desires to proactively or reactively modify an existing PDU session, information identifying one or more S-NSSAIs.

At step 708, the API layer 304 forwards the information to the 5G modem 302.

At step 710, the 5G modem 302 uses enhanced N1 signaling, e.g., a PDU Session Modification Request that contains information that identifies the S-NSSAI(s) selected by the slice consumer. It is noted that conventional N1 signaling does not support this function: there is currently no mechanism for a slice consumer to request the modification of an existing PDU session using a specified S-NSSAI value or values. This function is supported by an enhanced AMF 326 as described herein but not supported by a conventional AMF 108.

Figure 8:
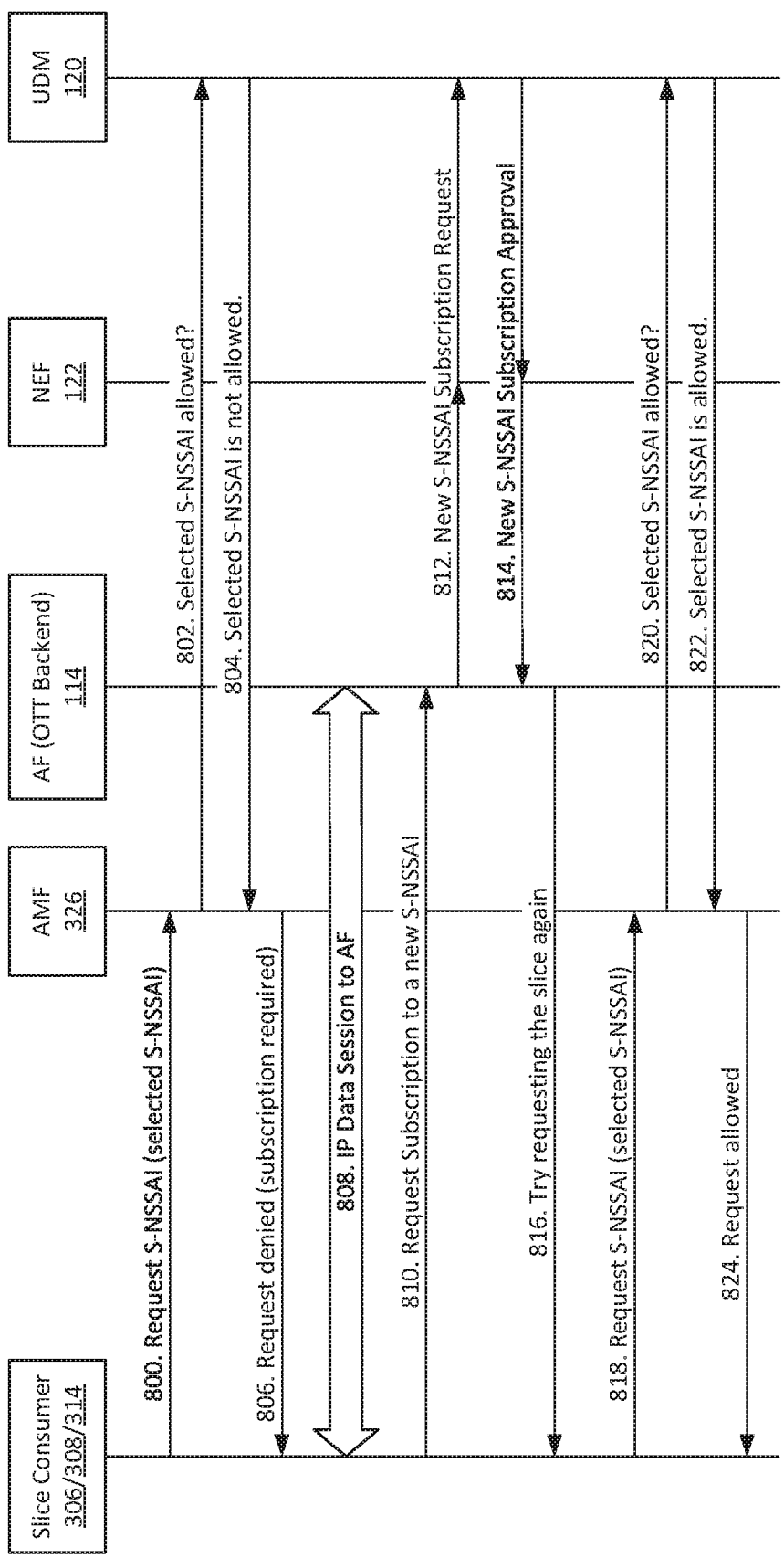
FIG. 8 illustrates an example of a scenario in which a request for a slice is denied according to some embodiments of the present disclosure.
Figure 9:
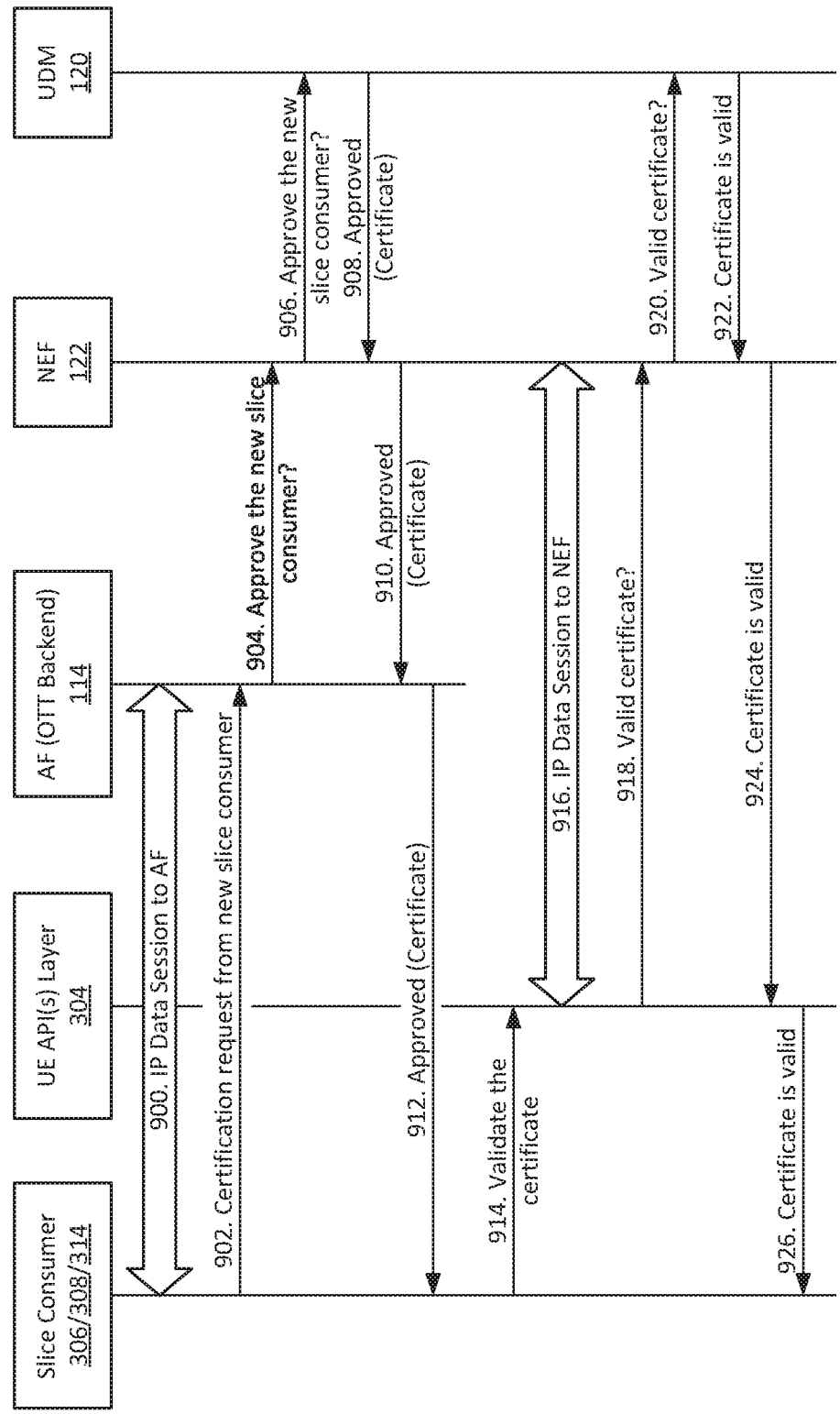
FIG. 9 illustrates an example in which a slice owner, such as an Over-The-Top provider, certifies a slice consumer and in which the slice consumer validates the certification with the network according to some embodiments of the present disclosure.

The call flows described above with regard to FIGS. 5 and 6 provide a mechanism to allow, block, or filter NSSAI-related requests and other activities from native and external applications—namely, the steps in which the UE 300 determines whether or not to allow a query from a particular slice consumer. In some embodiments, other network nodes may be involved in this process, e.g., where network slice owners or other network functions may be involved in AAA functions. In this manner, the network may be protected from malicious actors trying to use the exposed N1 capabilities to engage in unapproved network activities or even network attacks. FIGS. 8 and 9 illustrate two examples of the kinds of protection that the slice owners and/or network entities may provide to prevent unwanted or malicious activities by the slice consumers.

FIG. 8 illustrates an example of a scenario in which a request for a slice is denied because a subscription is required.

At step 800, a native or external slice consumer sends, to its serving AMF 326, a request for a selected S-NSSAI. The S-NSSAI may have been selected as a result of the steps taken in FIG. 5 or FIG. 6, for example. It will be understood that traffic between the slice consumer and the AMF 326 will pass through the API layer 304 and the 5G modem 302, which are omitted from FIG. 8 for clarity.

At step 802, the AMF 326 queries a slice manager to determine whether the selected S-NSSAI is allowed, e.g., available for use by the UE 300 or by the specific slice consumer. In the embodiment illustrated in FIG. 8, this function is performed by the UDM 120.

At step 804, the UDM 120 reports to the AMF 326 that the selected S-NSSAI is not allowed.

At step 806, the AMF 326 notifies the slice consumer that the request was denied. In the embodiment illustrated in FIG. 8, the AMF 326 also notifies the slice consumer that a subscription is required in order to have access to the requested slice.

The slice consumer then uses or establishes a data session 808 with the Over-the-Top (OTT) backend 114.

At step 810, the slice consumer sends to the OTT backend 114 a request to subscribe to the selected S-NSSAI.

At step 812, the OTT backend 114 forwards the subscription request to the UDM 120 via the Network Exposure Function (NEF) 122.

At step 814, the UDM 120 approves the subscription request and sends notification of the approval to the OTT backend 114 via the NEF 122.

At step 816, the OTT backend 114 then notifies the slice consumer to try the S-NSSAI request again.

At step 818, the slice consumer again requests the selected S-NSSAI.

At step 820, the AMF 326 queries the UDM 120 to determine whether or not the selected S-NSSAI is allowed.

At step 822, the UDM 120 notifies the AMF 326 that the S-NSSAI is allowed.

At step 824, the AMF 326 forwards to the slice consumer the notification that the requested S-NSSAI is allowed.

FIG. 9 illustrates an example in which a slice owner approves a slice request according to some embodiments of the present disclosure. In the embodiment illustrated in 9, a slice consumer (e.g., a native browser 306 or native application 308) already has a data session 900 with an Application Function 114 (e.g., an OTT backend server).

At step 902, a request is sent from a new slice consumer, which may be a native or external slice consumer, to the associated OTT backend 114. The OTT backend 114 needs to query an entity that certifies slice consumers to determine whether the requesting slice consumer is certified. In the embodiment illustrated in FIG. 9, the UDM 120 performs this function, but in alternative embodiments, this function may be performed by other operator network nodes, such as a PCF, HSS, or other database node. In the embodiment illustrated in FIG. 9, the OTT backend 114 is outside of the operator network; to get to the UDM 120, the OTT backend 114 must go through a NEF 122 to reach operator network nodes such as the UDM 120.

At step 904, therefore, the OTT backend 114 sends to the NEF 122 a message asking to approve the new slice consumer.

At step 906, the NEF 122 forwards the query to the UDM 120.

At step 908, the UDM 120 approves the new slice consumer and provides to the NEF 122 a certificate to be used by the UE 300. In some embodiments, the approval includes a certificate to match a certificate of the API layer 304.

At step 910, the NEF 122 forwards the certificate to the OTT backend 114.

At step 912, the OTT backend 114 forwards the certificate to the now-certified slice consumer. Thus, the slice consumer goes through the OTT backend 114 to get certified. Once certified, the slice consumer then communicates with the NEF 122 directly to validate the certificate.

At step 914, the slice consumer sends to the API layer 304 a request to validate the certificate. This request may include the certificate to be validated or may contain information that otherwise identifies the certificate to be validated. The API layer 304 communicates with the NEF 122 via an IP data session 916.

At step 918, the API layer 304 requests that the NEF 122 validate the certificate. This request may include the certificate to be validated or may contain information that otherwise identifies the certificate to be validated.

At step 920, the NEF 122 queries the UDM 120 to validate the certificate.

At step 922, the UDM 120 notifies the NEF 122 that the certificate is valid.

At step 924, the NEF 122 forwards this notification to the API layer 304.

At step 926, the API layer 204 forwards this notification to the slice consumer.

In some embodiments, the slice consumer will then include the certificate when it makes a slice-related request. In some embodiments, the API layer 304 and/or the 5G modem 302 will maintain copies of the received certificates and will use them to validate requests from slice consumers, e.g., a 5G modem 302, for example, may allow transmission of a request received from a slice consumer only if that request contains a certificate that matches one of the certificates maintained by the 5G modem 302. In other embodiments, the API layer 304 and/or the 5G modem 302 may operate in an open, non-restrictive mode, e.g., allowing any request from a slice consumer to pass through to the network without restriction. In still other embodiments, the API layer 304 and/or the 5G modem 302 may impose limited restrictions on what requests from slice consumers may be allowed out onto the network. The same principles described above may apply to restrict (or not restrict) incoming traffic from the network to the UE 300, as well.

FIGS. 8 and 9 illustrate the point that decisions from network slice owners and other network elements, including, but not limited to, AMFs 108/326, Session Management Functions (SMFs) 110, PCFs 112, Application Functions (AFs) 114, Network Slice Selection Functions (NSSFs) 116, Authentication Server Function (AUSFs) 118, UDMs 120, Network Repository Functions (NRFs), Online Charging Systems (OCSs), and so on, may take into consideration the information that now can be provided by native and external slice consumers according to embodiments of the present disclosure. In some embodiments, the information may be in the form of standardized NSSAI values.

New Call Flows

In some embodiments, a new call flow allows the 5G core systems, such as an NSSF, a PCF, and/or a UDM, for example, to control which slice consumers are authorized to influence the network. In some embodiments, the call flow illustrated in FIG. 8 would be enhanced, e.g., to incorporate a security mechanism whereby the particular slice consumer is subjected to an authentication, authorization, access, or other security procedure before being allowed to create or modify a PDU session.

In some embodiments, a new call flow allows the 5G core systems to accept new slice consumers' requests to be included in a white list of NSSAIs requests. In some embodiments, the call flow illustrated in FIG. 8 would be enhanced, e.g., to provide a mechanism by which a white list is created, maintained, and made available for query by network nodes that may be involved in slice-related network activities.

In some embodiments, a new call flow allows authorized slice consumers to request the subscription of new NSSAIs that are exposed by a 5G core system NSSAIs catalogue in the NSSF for example. In some embodiments, the call flow illustrated in FIG. 9 would be enhanced, e.g., to provide a mechanism whereby the slice consumer can query an NSSF 116 to find out what NSSAIs are available for subscription. This kind of query could be made prior to the initial NSSAI-related request, e.g., to see what NSSAIs are supported by the network and/or by the particular UE, or during the slice request process, e.g., after a request is denied, to find out what NSSAIs the slice consumer does have access to, or after a request is allowed, to find out what other NSSAIs the slice consumer may also take advantage of.

Other Embodiments

Figure 10:
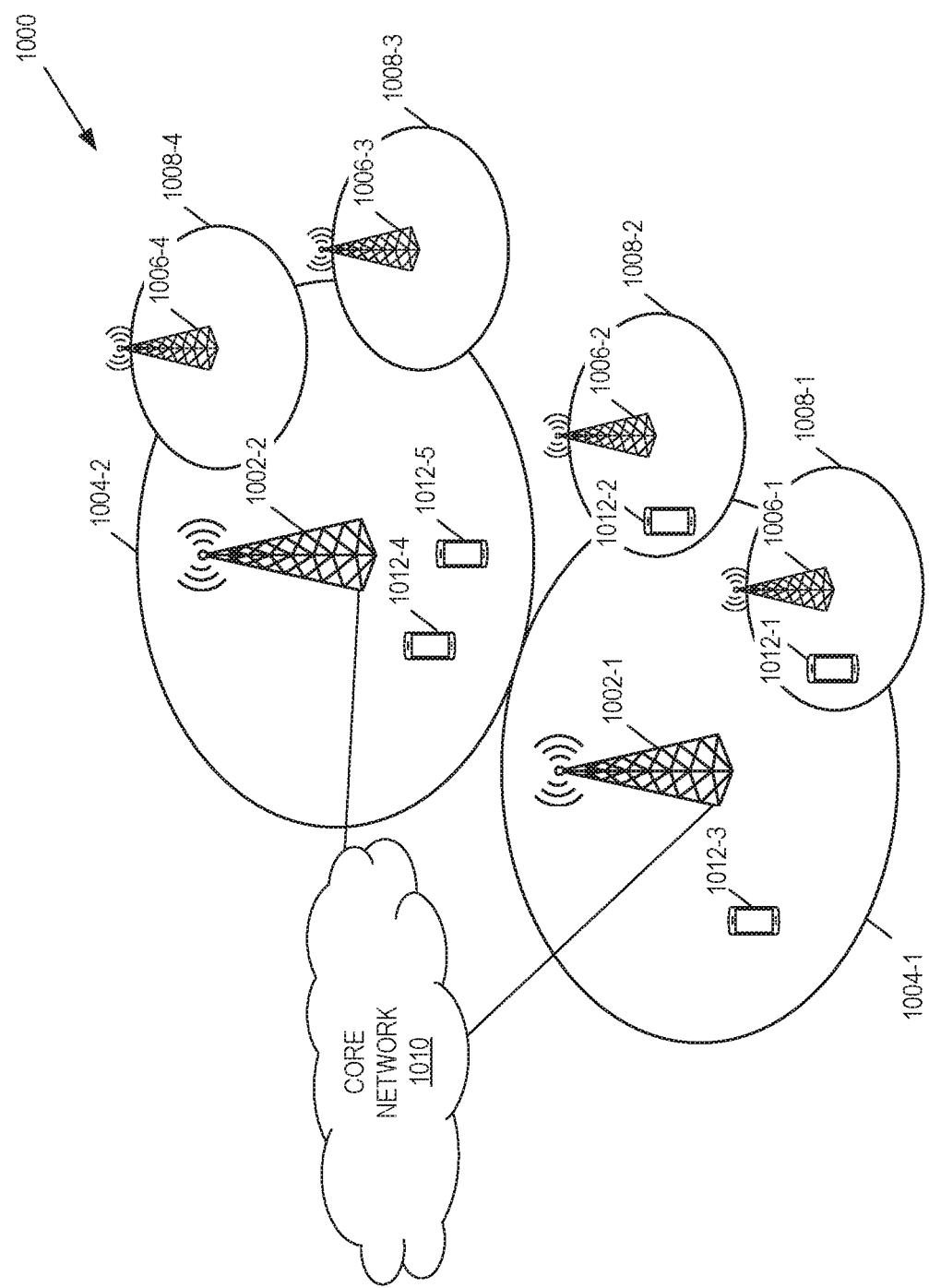
FIG. 10 illustrates an example of a cellular communications network according to some embodiments of the present disclosure.

FIG. 10 illustrates one example of a cellular communications network 1000 according to some embodiments of the present disclosure. In the embodiments described herein, the cellular communications network 1000 is a 5G NR network. In this example, the cellular communications network 1000 includes base stations 1002-1 and 1002-2, which in LTE are referred to as eNBs and in 5G NR are referred to as gNBs, controlling corresponding macro cells 1004-1 and 1004-2. The base stations 1002-1 and 1002-2 are generally referred to herein collectively as base stations 1002 and individually as base station 1002. Likewise, the macro cells 1004-1 and 1004-2 are generally referred to herein collectively as macro cells 1004 and individually as macro cell 1004. The cellular communications network 1000 also includes a number of low power nodes 1006-1 through 1006-4 controlling corresponding small cells 1008-1 through 1008-4. The low power nodes 1006-1 through 1006-4 can be small base stations (such as pico or femto base stations) or Remote Radio Heads (RRHs), or the like. Notably, while not illustrated, one or more of the small cells 1008-1 through 1008-4 may alternatively be provided by the base stations 1002. The low power nodes 1006-1 through 1006-4 are generally referred to herein collectively as low power nodes 1006 and individually as low power node 1006. Likewise, the small cells 1008-1 through 1008-4 are generally referred to herein collectively as small cells 1008 and individually as small cell 1008. The base stations 1002 (and optionally the low power nodes 1006) are connected to a core network 1010.

The base stations 1002 and the low power nodes 1006 provide service to wireless devices 1012-1 through 1012-5 in the corresponding cells 1004 and 1008. The wireless devices 1012-1 through 1012-5 are generally referred to herein collectively as wireless devices 1012 and individually as wireless device 1012. The wireless devices 1012 are also sometimes referred to herein as UEs.

Figure 11:
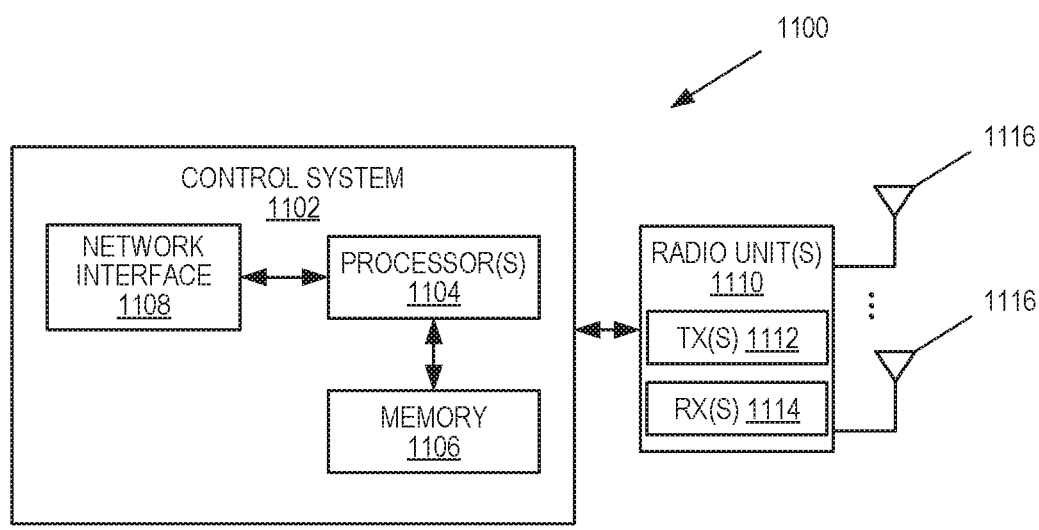
FIG. 11 is a schematic block diagram of a radio access node according to some embodiments of the present disclosure.

FIG. 11 is a schematic block diagram of a radio access node 1100 according to some embodiments of the present disclosure. The radio access node 1100 may be, for example, a base station 1002 or 1006. As illustrated, the radio access node 1100 includes a control system 1102 that includes one or more processors 1104 (e.g., Central Processing Units (CPUs), Application Specific Integrated Circuits (ASICs), Field Programmable Gate Arrays (FPGAs), and/or the like), memory 1106, and a network interface 1108. In addition, the radio access node 1100 includes one or more radio units 1110 that each includes one or more transmitters 1112 and one or more receivers 1114 coupled to one or more antennas 1116. In some embodiments, the radio unit(s) 1110 is external to the control system 1102 and connected to the control system 1102 via, e.g., a wired connection (e.g., an optical cable). However, in some other embodiments, the radio unit(s) 1110 and potentially the antenna(s) 1116 are integrated together with the control system 1102. The one or more processors 1104 operate to provide one or more functions of a radio access node 1100 as described herein. In some embodiments, the function(s) are implemented in software that is stored, e.g., in the memory 1106 and executed by the one or more processors 1104.

Figure 12:
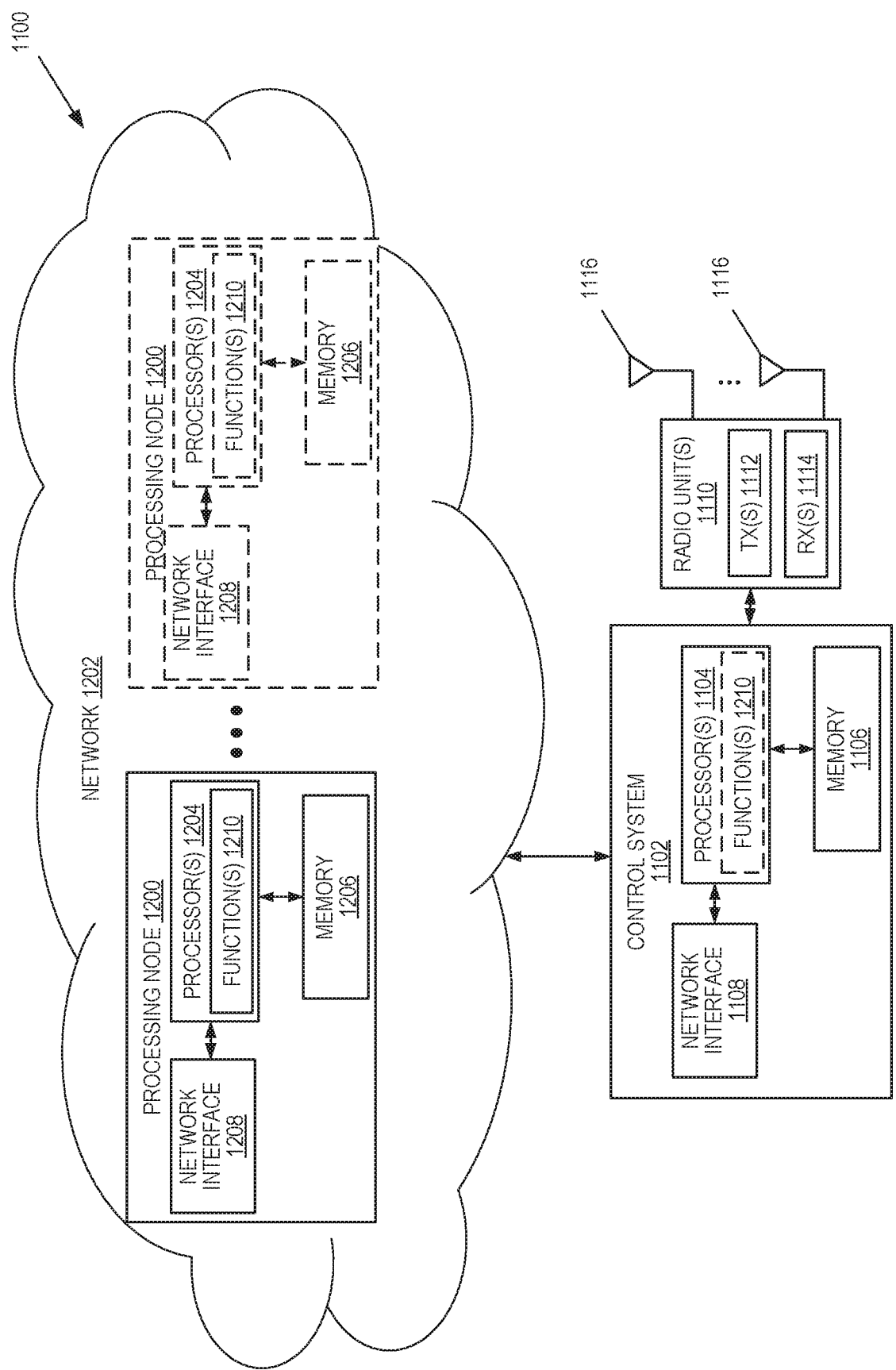
FIG. 12 is a schematic block diagram that illustrates a virtualized embodiment of the radio access node of FIG. 11 according to some embodiments of the present disclosure.

FIG. 12 is a schematic block diagram that illustrates a virtualized embodiment of the radio access node 1100 according to some embodiments of the present disclosure. This discussion is equally applicable to other types of network nodes. Further, other types of network nodes may have similar virtualized architectures.

As used herein, a "virtualized" radio access node is an implementation of the radio access node 1100 in which at least a portion of the functionality of the radio access node 1100 is implemented as a virtual component(s) (e.g., via a virtual machine(s) executing on a physical processing node(s) in a network(s)). As illustrated, in this example, the radio access node 1100 includes the control system 1102 that includes the one or more processors 1104 (e.g., CPUs, ASICs, FPGAs, and/or the like), the memory 1106, and the network interface 1108 and the one or more radio units 1110 that each includes the one or more transmitters 1112 and the one or more receivers 1114 coupled to the one or more antennas 1116, as described above. The control system 1102 is connected to the radio unit(s) 1110 via, for example, an optical cable or the like. The control system 1102 is connected to one or more processing nodes 1200 coupled to or included as part of a network(s) 1202 via the network interface 1108. Each processing node 1200 includes one or more processors 1204 (e.g., CPUs, ASICs, FPGAs, and/or the like), memory 1206, and a network interface 1208.

In this example, functions 1210 of the radio access node 1100 described herein are implemented at the one or more processing nodes 1200 or distributed across the control system 1102 and the one or more processing nodes 1200 in any desired manner. In some particular embodiments, some or all of the functions 1210 of the radio access node 1100 described herein are implemented as virtual components executed by one or more virtual machines implemented in a virtual environment(s) hosted by the processing node(s) 1200. As will be appreciated by one of ordinary skill in the art, additional signaling or communication between the processing node(s) 1200 and the control system 1102 is used in order to carry out at least some of the desired functions 1210. Notably, in some embodiments, the control system 1102 may not be included, in which case the radio unit(s) 1110 communicate directly with the processing node(s) 1200 via an appropriate network interface(s).

In some embodiments, a computer program including instructions which, when executed by at least one processor, causes the at least one processor to carry out the functionality of radio access node 1100 or a node (e.g., a processing node 1200) implementing one or more of the functions 1210 of the radio access node 1100 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
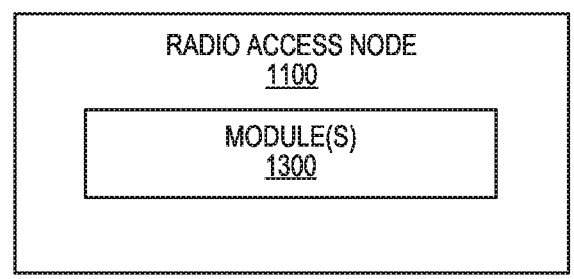
FIG. 13 is a schematic block diagram of the radio access node of FIG. 11 according to some other embodiments of the present disclosure.

FIG. 13 is a schematic block diagram of the radio access node 1100 according to some other embodiments of the present disclosure. The radio access node 1100 includes one or more modules 1300, each of which is implemented in software. The module(s) 1300 provide the functionality of the radio access node 1100 described herein. This discussion is equally applicable to the processing node 1200 of FIG. 12 where the modules 1300 may be implemented at one of the processing nodes 1200 or distributed across multiple processing nodes 1200 and/or distributed across the processing node(s) 1200 and the control system 1102.

Figure 14:
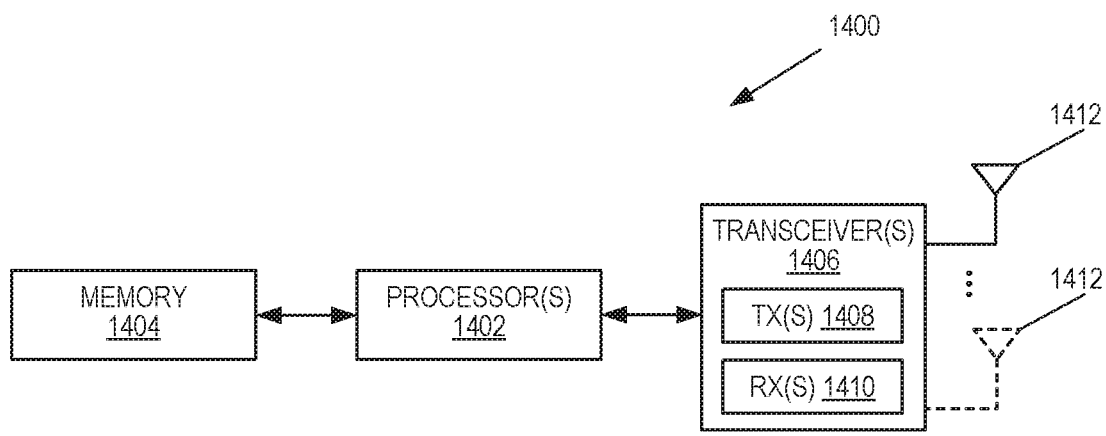
FIG. 14 is a schematic block diagram of a User Equipment device (UE) according to some embodiments of the present disclosure.

FIG. 14 is a schematic block diagram of a UE 1400 according to some embodiments of the present disclosure. As illustrated, the UE 1400 includes one or more processors 1402 (e.g., CPUs, ASICs, FPGAs, and/or the like), memory 1404, and one or more transceivers 1406 each including one or more transmitters 1408 and one or more receivers 1410 coupled to one or more antennas 1412. In some embodiments, the functionality of the UE 1400 described above may be fully or partially implemented in software that is, e.g., stored in the memory 1404 and executed by the processor(s) 1402.

In some embodiments, a computer program including instructions which, when executed by at least one processor, causes the at least one processor to carry out the functionality of the UE 1400 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
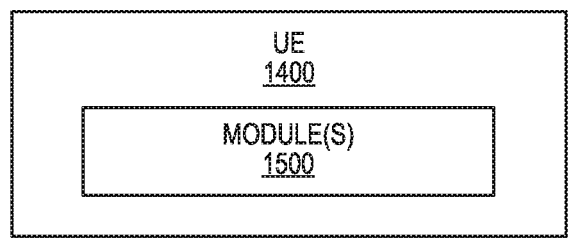
FIG. 15 is a schematic block diagram of the UE of FIG. 14 according to some other embodiments of the present disclosure.

FIG. 15 is a schematic block diagram of the UE 1400 according to some other embodiments of the present disclosure. The UE 1400 includes one or more modules 1500, each of which is implemented in software. The module(s) 1500 provide the functionality of the UE 1400 described herein.

Figure 16:
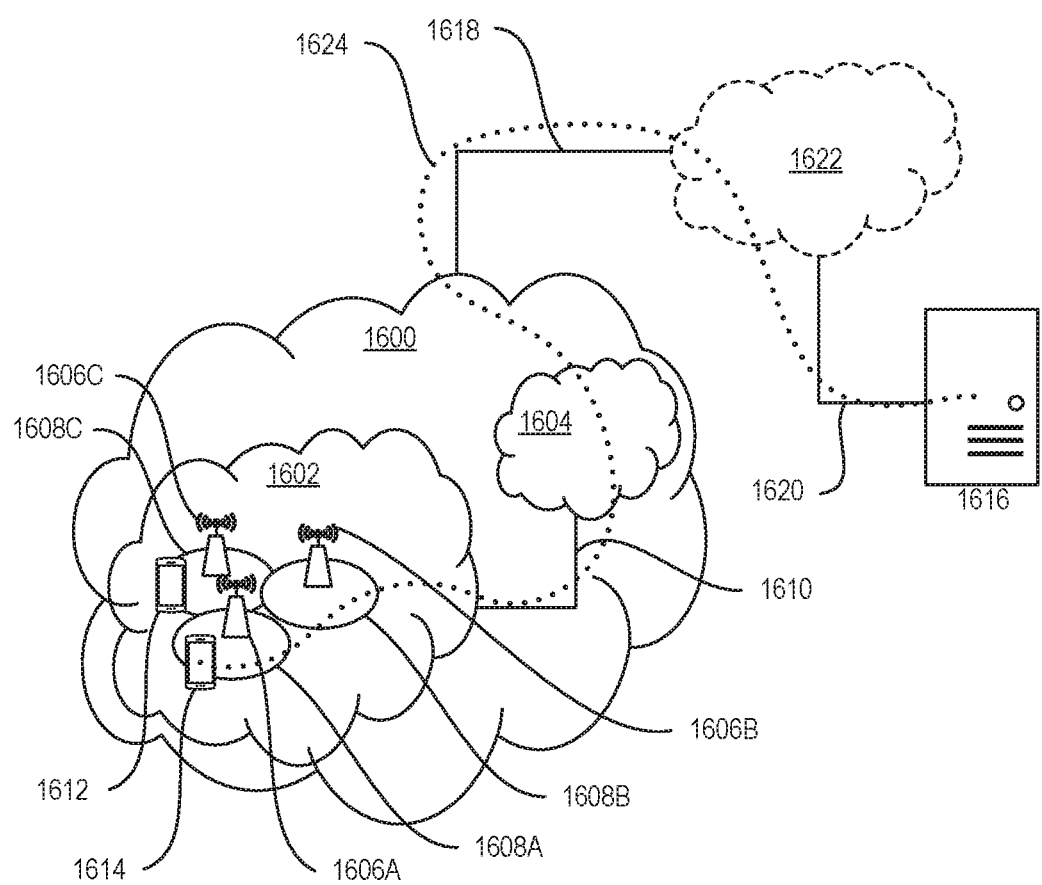
FIG. 16 illustrates a telecommunication network connected via an intermediate network to a host computer in accordance with some embodiments of the present disclosure.

FIG. 16 illustrates a communication system according to some embodiments of the present disclosure. In the embodiment illustrated in FIG. 16, the communication system includes a telecommunication network 1600, such as a 3GPP-type cellular network, which comprises an access network 1602, such as a RAN, and a core network 1604. The access network 1602 comprises a plurality of base stations 1606A, 1606B, 1606C, such as Node Bs (NBs), eNBs, gNBs, or other types of wireless Access Points (APs), each defining a corresponding coverage area 1608A, 1608B, 1608C. Each base station 1606A, 1606B, 1606C is connectable to the core network 1604 over a wired or wireless connection 1610. A first UE 1612 located in coverage area 1608C is configured to wirelessly connect to, or be paged by, the corresponding base station 1606C. A second UE 1614 in coverage area 1608A is wirelessly connectable to the corresponding base station 1606A. While a plurality of UEs 1612, 1614 are illustrated in this example, the disclosed embodiments are equally applicable to a situation where a sole UE is in the coverage area or where a sole UE is connecting to the corresponding base station 1606.

The telecommunication network 1600 is itself connected to a host computer 1616, which may be embodied in the hardware and/or software of a standalone server, a cloud-implemented server, a distributed server, or as processing resources in a server farm. The host computer 1616 may be under the ownership or control of a service provider, or may be operated by the service provider or on behalf of the service provider. Connections 1618 and 1620 between the telecommunication network 1600 and the host computer 1616 may extend directly from the core network 1604 to the host computer 1616 or may go via an optional intermediate network 1622. The intermediate network 1622 may be one of, or a combination of more than one of, a public, private, or hosted network; the intermediate network 1622, if any, may be a backbone network or the Internet; in particular, the intermediate network 1622 may comprise two or more sub-networks (not shown).

The communication system of FIG. 16 as a whole enables connectivity between the connected UEs 1612, 1614 and the host computer 1616. The connectivity may be described as an OTT connection 1624. The host computer 1616 and the connected UEs 1612, 1614 are configured to communicate data and/or signaling via the OTT connection 1624, using the access network 1602, the core network 1604, any intermediate network 1622, and possible further infrastructure (not shown) as intermediaries. The OTT connection 1624 may be transparent in the sense that the participating communication devices through which the OTT connection 1624 passes are unaware of routing of uplink and downlink communications. For example, the base station 1606 may not or need not be informed about the past routing of an incoming downlink communication with data originating from the host computer 1616 to be forwarded (e.g., handed over) to a connected UE 1612. Similarly, the base station 1606 need not be aware of the future routing of an outgoing uplink communication originating from the UE 1612 towards the host computer 1616.

Figure 17:
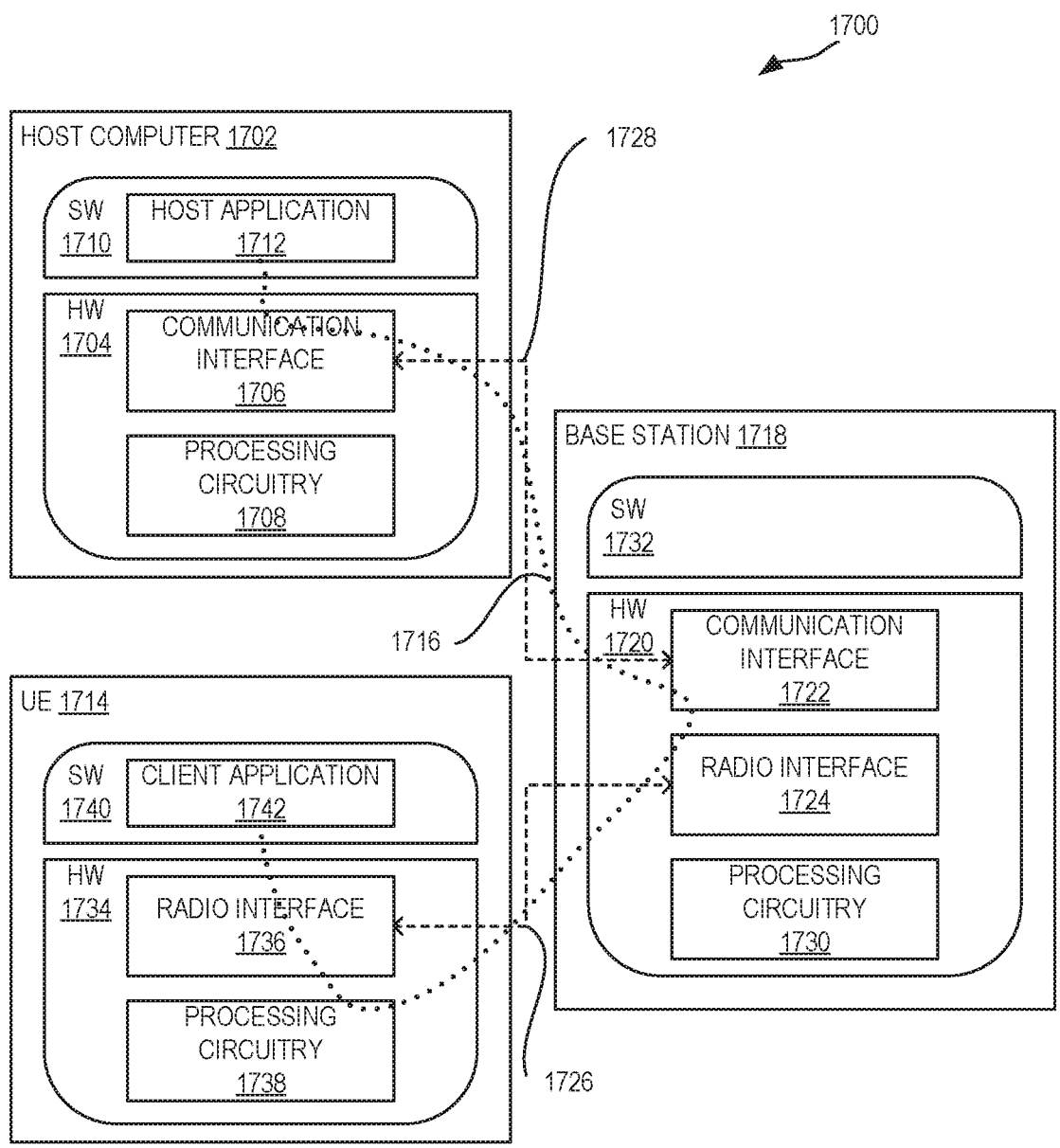
FIG. 17 is a generalized block diagram of a host computer communicating via a base station with a UE over a partially wireless connection in accordance with some embodiments of the present disclosure.

FIG. 17 illustrates a communication system according to other embodiments of the present disclosure. The UE, base station, and host computer discussed in the preceding paragraphs will now be described with reference to FIG. 17. In the embodiment illustrated in FIG. 17, in a communication system 1700, a host computer 1702 comprises hardware 1704 including a communication interface 1706 configured to set up and maintain a wired or wireless connection with an interface of a different communication device of the communication system 1700. The host computer 1702 further comprises processing circuitry 1708, which may have storage and/or processing capabilities. In particular, the processing circuitry 1708 may comprise one or more programmable processors, ASICs, FPGAs, or combinations of these (not shown) adapted to execute instructions. The host computer 1702 further comprises software 1710, which is stored in or accessible by the host computer 1702 and executable by the processing circuitry 1708. The software 1710 includes a host application 1712. The host application 1712 may be operable to provide a service to a remote user, such as a UE 1714 connecting via an OTT connection 1716 terminating at the UE 1714 and the host computer 1702. In providing the service to the remote user, the host application 1712 may provide user data which is transmitted using the OTT connection 1716.

The communication system 1700 further includes a base station 1718 provided in a telecommunication system and comprising hardware 1720 enabling it to communicate with the host computer 1702 and with the UE 1714. The hardware 1720 may include a communication interface 1722 for setting up and maintaining a wired or wireless connection with an interface of a different communication device of the communication system 1700, as well as a radio interface 1724 for setting up and maintaining at least a wireless connection 1726 with the UE 1714 located in a coverage area (not shown in FIG. 17) served by the base station 1718. The communication interface 1722 may be configured to facilitate a connection 1728 to the host computer 1702. The connection 1728 may be direct or it may pass through a core network (not shown in FIG. 17) of the telecommunication system and/or through one or more intermediate networks outside the telecommunication system. In the embodiment shown, the hardware 1720 of the base station 1718 further includes processing circuitry 1730, which may comprise one or more programmable processors, ASICs, FPGAs, or combinations of these (not shown) adapted to execute instructions. The base station 1718 further has software 1732 stored internally or accessible via an external connection.

The communication system 1700 further includes the UE 1714 already referred to. The UE's 1714 hardware 1734 may include a radio interface 1736 configured to set up and maintain a wireless connection 1726 with a base station serving a coverage area in which the UE 1714 is currently located. The hardware 1734 of the UE 1714 further includes processing circuitry 1738, which may comprise one or more programmable processors, ASICs, FPGAs, or combinations of these (not shown) adapted to execute instructions. The UE 1714 further comprises software 1740, which is stored in or accessible by the UE 1714 and executable by the processing circuitry 1738. The software 1740 includes a client application 1742. The client application 1742 may be operable to provide a service to a human or non-human user via the UE 1714, with the support of the host computer 1702. In the host computer 1702, the executing host application 1712 may communicate with the executing client application 1742 via the OTT connection 1716 terminating at the UE 1714 and the host computer 1702. In providing the service to the user, the client application 1742 may receive request data from the host application 1712 and provide user data in response to the request data. The OTT connection 1716 may transfer both the request data and the user data. The client application 1742 may interact with the user to generate the user data that it provides.

It is noted that the host computer 1702, the base station 1718, and the UE 1714 illustrated in FIG. 17 may be similar or identical to the host computer 1616, one of the base stations 1606A, 1606B, 1606C, and one of the UEs 1612, 1614 of FIG. 16, respectively. This is to say, the inner workings of these entities may be as shown in FIG. 17 and independently, the surrounding network topology may be that of FIG. 16.

In FIG. 17, the OTT connection 1716 has been drawn abstractly to illustrate the communication between the host computer 1702 and the UE 1714 via the base station 1718 without explicit reference to any intermediary devices and the precise routing of messages via these devices. The network infrastructure may determine the routing, which may be configured to hide from the UE 1714 or from the service provider operating the host computer 1702, or both. While the OTT connection 1716 is active, the network infrastructure may further take decisions by which it dynamically changes the routing (e.g., on the basis of load balancing consideration or reconfiguration of the network).

The wireless connection 1726 between the UE 1714 and the base station 1718 is in accordance with the teachings of the embodiments described throughout this disclosure. One or more of the various embodiments improve the performance of OTT services provided to the UE 1714 using the OTT connection 1716, in which the wireless connection 1726 forms the last segment. More precisely, the teachings of these embodiments allow native and external slice consumers to have awareness of network slices generally (and perhaps of NSSAIs specifically) and to have a mechanism by which the slice consumers can use this awareness to request slice-related actions. These capabilities thereby provide benefits such as giving the slice consumers the ability to request network slices that are appropriate to the needs of the slice consumer as well as to proactively request the creation of new slices (or the modification of existing slices) in response to instantaneous or predicted need.

A measurement procedure may be provided for the purpose of monitoring data rate, latency, and other factors on which the one or more embodiments improve. There may further be an optional network functionality for reconfiguring the OTT connection 1716 between the host computer 1702 and the UE 1714, in response to variations in the measurement results. The measurement procedure and/or the network functionality for reconfiguring the OTT connection 1716 may be implemented in the software 1710 and the hardware 1704 of the host computer 1702 or in the software 1740 and the hardware 1734 of the UE 1714, or both. In some embodiments, sensors (not shown) may be deployed in or in association with communication devices through which the OTT connection 1716 passes; the sensors may participate in the measurement procedure by supplying values of the monitored quantities exemplified above, or supplying values of other physical quantities from which the software 1710, 1740 may compute or estimate the monitored quantities. The reconfiguring of the OTT connection 1716 may include message format, retransmission settings, preferred routing, etc.; the reconfiguring need not affect the base station 1714, and it may be unknown or imperceptible to the base station 1714. Such procedures and functionalities may be known and practiced in the art. In certain embodiments, measurements may involve proprietary UE signaling facilitating the host computer 1702's measurements of throughput, propagation times, latency, and the like. The measurements may be implemented in that the software 1710 and 1740 causes messages to be transmitted, in particular empty or 'dummy' messages, using the OTT connection 1716 while it monitors propagation times, errors, etc.

Figures 18, 19:
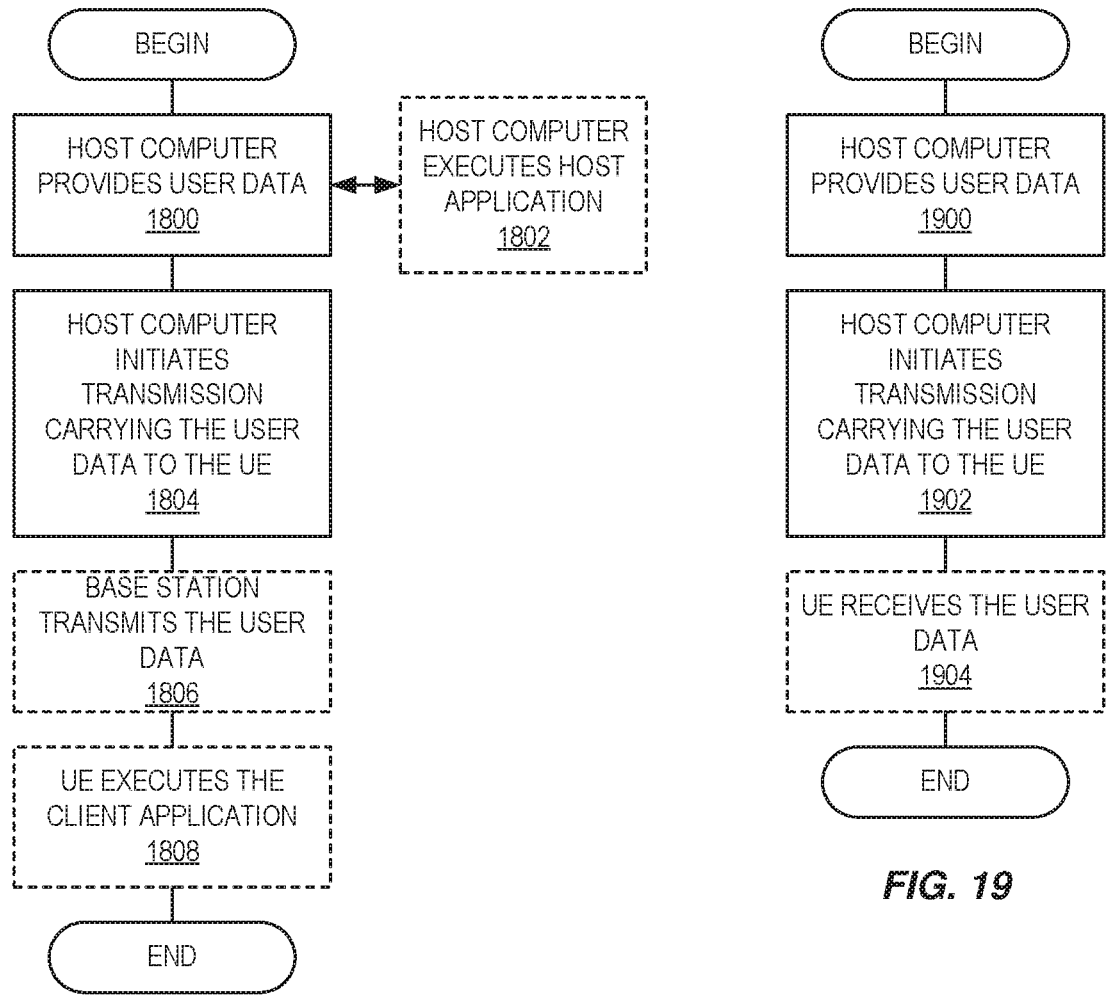
FIG. 18 is a flowchart illustrating a method implemented in a communication system in accordance with some embodiments of the present disclosure.
FIG. 19 is a flowchart illustrating a method implemented in a communication system in accordance with some embodiments of the present disclosure.

FIG. 18 is a flowchart illustrating a method implemented in a communication system, in accordance with some embodiments. The communication system includes a host computer, a base station, and a UE which may be those described with reference to FIGS. 16 and 17. For simplicity of the present disclosure, only drawing references to FIG. 18 will be included in this section. In step 1800, the host computer provides user data. In sub-step 1802 (which may be optional) of step 1800, the host computer provides the user data by executing a host application. In step 1804, the host computer initiates a transmission carrying the user data to the UE. In step 1806 (which may be optional), the base station transmits to the UE the user data which was carried in the transmission that the host computer initiated, in accordance with the teachings of the embodiments described throughout this disclosure. In step 1808 (which may also be optional), the UE executes a client application associated with the host application executed by the host computer.

FIG. 19 is a flowchart illustrating a method implemented in a communication system, in accordance with some embodiments. The communication system includes a host computer, a base station, and a UE which may be those described with reference to FIGS. 16 and 17. For simplicity of the present disclosure, only drawing references to FIG. 19 will be included in this section. In step 1900 of the method, the host computer provides user data. In an optional sub-step (not shown) the host computer provides the user data by executing a host application. In step 1902, the host computer initiates a transmission carrying the user data to the UE. The transmission may pass via the base station, in accordance with the teachings of the embodiments described throughout this disclosure. In step 1904 (which may be optional), the UE receives the user data carried in the transmission.

FIG. 20 is a flowchart illustrating a method implemented in a communication system, in accordance with some embodiments. The communication system includes a host computer, a base station, and a UE which may be those described with reference to FIGS. 16 and 17. For simplicity of the present disclosure, only drawing references to FIG. 20 will be included in this section. In step 2000 (which may be optional), the UE receives input data provided by the host computer. Additionally or alternatively, in step 2002, the UE provides user data. In sub-step 2004 (which may be optional) of step 2000, the UE provides the user data by executing a client application. In sub-step 2006 (which may be optional) of step 2002, the UE executes a client application which provides the user data in reaction to the received input data provided by the host computer. In providing the user data, the executed client application may further consider user input received from the user. Regardless of the specific manner in which the user data was provided, the UE initiates, in sub-step 2008 (which may be optional), transmission of the user data to the host computer. In step 2010 of the method, the host computer receives the user data transmitted from the UE, in accordance with the teachings of the embodiments described throughout this disclosure.

FIG. 21 is a flowchart illustrating a method implemented in a communication system, in accordance with some embodiments. The communication system includes a host computer, a base station, and a UE which may be those described with reference to FIGS. 16 and 17. For simplicity of the present disclosure, only drawing references to FIG. 21 will be included in this section. In step 2100 (which may be optional), in accordance with the teachings of the embodiments described throughout this disclosure, the base station receives user data from the UE. In step 2102 (which may be optional), the base station initiates transmission of the received user data to the host computer. In step 2104 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the invention, it should be understood that such order is exemplary (e.g., alternative embodiments may perform the operations in a different order, combine certain operations, overlap certain operations, etc.).

The subject matter of the present disclosure (herein referred to as "the solution") provides several advantages over conventional systems. These advantages include, but are not limited to, the following:

The solution provides a mechanism to empower native and external slice consumers to participate in the end-to-end customer experience, and possibly in the flow of money for 5G monetization, by participating in the creation and modification of network slices.

In 5G, network slices are "intended-based" delivery, and by allowing native and external slice consumers to express their needs, the solution helps the network to predict what type of network resources may be needed when and where is needed.

The solution reuses existing 5G Core Systems elements and existing or future call flows, and thus minimizes the impact of the implementation. Changes are needed only in the UE (devices) ecosystem, most of which may be implemented by changes to software or firmware within the UE.

The solution gives MNOs/MVNOs an alternative to monetize their network capabilities from OTT flow of money, e.g., via charging for the use of the new APIs.

The solution brings the opportunity for the UE ecosystem to dynamically take full advantage of the 5G spectrum flexibility, from Low-, through Mid-, and all the way to the High Bands. The solution enables a UE to send S-NSSAI values to accommodate bandwidth/frequency resources from these totally different types of 5G stratum access.

The solution brings the opportunity for the UE ecosystem to dynamically take full advantage of the 5G Core Systems flexibility, from different physical locations of UPFs, such as UPFs on premises, UPFs accessible via access sites, or centralized UPFs. The solution enables a UE to send S-NSSAI values to accommodate resources from these distributed UPFs architecture.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
AAA Authentication, Authorization, and Access
AF Application Function
AMF Core Access and Mobility Management Function
AN Access Node
AP Access Point
API Application Programming Interface
AR Augmented Reality
ASIC Application Specific Integrated Circuit
AUSF Authentication Server Function
CDN Content Delivery Network
CPE Customer Premise Equipment
CPU Central Processing Unit
DN Data Network
DSP Digital Signal Processor
eMBB Enhanced Mobile Broadband
eMTC Enhanced Machine Type Communication
eNB Enhanced or Evolved Node B
FPGA Field Programmable Gate Array
GHz Gigahertz
gNB New Radio Base Station
HSS Home Subscriber Server
ID Identifier/Identity
LoRa Long Range (wireless data communication)
LTE Long Term Evolution
MME Mobility Management Entity
MNO Mobile Network Operator
MRTG Multiplayer, Real Time Game MTC Machine Type Communication
MVNO Mobile Virtual Network Operator
NB Node B
NEF Network Exposure Function
NR New Radio
NRF Network Repository Function
NSSAI Network Slice Selection Assistance Information
NSSF Network Slice Selection Function
OCS Online Charging System
OTT Over-the-Top
PCF Policy Control Function
PDU Protocol Data Unit
P-GW Packet Data Network Gateway
PLMN Public Land Mobile Network
QCI Quality of Service Class Identifier
QoS Quality of Service
RAM Random Access Memory
RAN Radio Access Network
REST Representational State Transfer protocol
ROM Read Only Memory
RRH Remote Radio Head
SCEF Service Capability Exposure Function
SMF Session Management Function
S-NSSAI Single Network Slice Selection Assistance Information
TS Technical Specification
UAV Unmanned Aerial Vehicle
UDM Unified Data Management
UE User Equipment
UPF User Plane Function
URLLC Ultra-Reliable Low Latency Communication
UTRAN Universal Terrestrial Radio Access Network Those skilled in the art will recognize improvements and modifications to the embodiments of the present disclosure. All such improvements and modifications are considered within the scope of the concepts disclosed herein.

What is claimed is:

1. A method for allowing slice consumers within or attached to a client device operating in a telecommunications network to access and use Network Slice Selection Assistance Information (NSSAI), the method comprising:
   at the client device:
   receiving, at an Application Programming Interface (API) layer within the client device, a query for NSSAI, the query being sent by a slice consumer;
   sending, to a Fifth Generation (5G) modem within the client device, the query for NSSAI;
   receiving, from the 5G modem, a response to the query for NSSAI;
   sending, to the slice consumer, the response to the query for NSSAI; and
   in response the receiving the query for NSSAI, fetching, by the 5G modem and from a Core Access and Mobility Management Function (AMF), a list of Single NSSAIs (S-NSSAIs) available for a User Equipment (UE) from the AMF, wherein sending the response to the query for the NSSAI comprises sending the list of S-NSSAIs available for the UE received from the AMF.

2. The method of claim 1, wherein, upon receiving the query for NSSAI, the API layer determines whether the query for NSSAI is allowed and sending the query for NSSAI to the 5G modem only when the query for NSSAI is allowed.

3. The method of claim 1, wherein receiving the query for NSSAI comprises receiving the query from a native slice consumer within the client device and wherein sending the response to the query for NSSAI comprises sending a response to the native slice consumer.

4. The method of claim 3, wherein the native slice consumer comprises a browser or a native application.

5. The method of claim 1, wherein receiving the query for NSSAI comprises receiving the query from an external slice consumer attached to the client device and wherein sending the response to the query for NSSAI comprises sending the response to the external slice consumer.

6. The method of claim 5, wherein receiving the query from the external slice consumer attached to the client device comprises receiving the query via a wired interface or a wireless interface of a User Equipment (UE) and wherein sending the response to the external slice consumer comprises sending the response via the wired interface or the wireless interface of the UE.

7. The method of claim 1 wherein fetching the list of S-NSSAIs from the AMF comprises: sending, a request for a list of S-NSSAIs available from the network; and receiving, from the AMF, the list of S-NSSAIs available from the network.

8. The method of claim 1 further comprising, at the API layer: receiving, from the slice consumer information identifying at least one S-NSSAI; and sending, to the 5G modem, the information identifying the at least one S-NSSAI.

9. The method of claim 8, wherein receiving the information identifying the at least one S-NSSAI comprises receiving the information identifying the at least one S-NSSAI from a native slice consumer.

10. The method of claim 9, wherein receiving the information identifying the at least one S-NSSAI from a native slice consumer comprises receiving the information from a browser or a native application.

11. The method of claim 8, wherein receiving the information identifying the at least one S-NSSAI comprises receiving the information identifying the at least one S-NSSAI from the external slice consumer.

12. The method of claim 11, wherein receiving the information identifying the at least one S-NSSAI from the external slice consumer comprises receiving the information identifying the at least one S-NSSAI via a wired interface or a wireless interface.

13. The method of claim 8, further comprising, at the 5G modem:
   receiving the information identifying the at least one S-NSSAI; and
   sending, to a Core Access and Mobility Management Function (AMF) an N1 interface signaling message.

14. The method of claim 13, wherein sending the N1 interface signaling message comprises sending the N1 interface signaling message comprising the information identifying the at least one S-NSSAI.

15. The method of claim 13, wherein sending the N1 interface signaling message comprises sending a Protocol Data Unit (PDU) Session Establishment Request.

16. The method of claim 13, wherein sending the N1 interface signaling message comprises sending a Protocol Data Unit (PDU) Session Modification Request.

17. The method of claim 13, wherein sending the N1 interface signaling message comprises sending, to the AMF, a request involving a selected S-NSSAI.

18. The method of claim 17, further comprising:
   receiving, from the AMF, a notification that the request was denied; and
   sending, to an Application Function (AF), a request to subscribe to the selected S-NSSAI.

19. The method of claim 18, further comprising receiving, from the AF an indication that the request to subscribe to the selected S-NSSAI was approved.

20. The method of claim 19, further comprising sending, to the AMF, a request involving the selected S-NSSAI and receiving, from the AMF, a notification that the request was allowed.

21. The method of claim 1, further comprising:
sending, from the slice consumer to an Application Function (AF), a request for certification of the slice consumer by the network; and
receiving, from the AF, a certificate for use by the slice consumer.

22. The method of claim 21, further comprising, at the API layer:
receiving, from the slice consumer a request to validate the certificate received by the AF;
sending, to a Network Exposure Function (NEF), the request to validate the certificate;
receiving, from the NEF, notification that the certificate is valid or invalid; and
forwarding, to the slice consumer, the received notification that the certificate is valid or invalid.

23. The method of claim 21, further comprising:
at the AF:
receiving, from a User Equipment (UE), the request for certification of the slice consumer by the network;
sending, to a slice manager, the request for certification of the slice consumer;
receiving, from the slice manager, a certificate for use by the slice consumer; and
sending, to the UE, the certificate for use by the slice consumer.

24. The method of claim 23, wherein sending the request to the slice manager comprises sending the request to the slice manager via a Network Exposure Function (NEF), and wherein receiving the certificate from the slice manager comprises receiving the certificate from the slice manager via the NEF.

25. The method of claim 23, wherein the AF comprises an Over-The-Top (OTT) backend server.

26. The method of claim 22, further comprising:
at the NEF:
receiving, from a User Equipment (UE), the request to validate the certificate;
sending, to the slice manager, the request to validate the certificate;
receiving, from the slice manager, a notification that the certificate is valid or invalid; and
sending, to the UE, the notification that the certificate is valid or invalid.

27. The method of claim 23, wherein the slice manager comprises a Unified Data Management (UDM), a Policy Control Function (PCF), a Network Slice Selection Function (NSSF), or a Home Subscriber Server (HSS).

28. A client device for operating in a telecommunications network and that allows slice consumers within or attached to the client device to access and use Network Slice Selection Assistance Information (NSSAI), the client device comprising:
a modem for communicating with the telecommunications network;
an Application Programming Interface (API) layer for providing at least one API by which a network slice consumer may request network slice information or may perform network slice related network functions;
one or more processors; and
memory storing instructions executable by the one or more processors, whereby the client device is operable to:
receive, at the API layer within the client device, a query for NSSAI, the query being sent by a slice consumer;
send, to a Fifth Generation (5G) modem within the client device, the query for NSSAI;
receive, from the 5G modem, a response to the query for NSSAI;
send, to the slice consumer, the response to the query for NSSAI; and
in response the receiving the query for NSSAI, fetching, by the 5G modem and from a Core Access and Mobility Management Function (AMF), a list of Single NSSAIs (S-NSSAIs) available for a User Equipment (UE) from the AMF, wherein sending the response to the query for the NSSAI comprises sending the list of S-NSSAIs available for the UE received from the AMF.

29. A client device for operating in a telecommunications network and that allows slice consumers within or attached to the client device to access and use Network Slice Selection Assistance Information (NSSAI), the client device being adapted to:
receive, at an Application Programming Interface (API) layer within the client device, a query for NSSAI, the query being sent by a slice consumer;
send, to a Fifth Generation (5G) modem within the client device, the query for NSSAI;
receive, from the 5G modem, a response to the query for NSSAI;
send, to the slice consumer, the response to the query for NSSAI; and
in response the receiving the query for NSSAI, fetching, by the 5G modem and from a Core Access and Mobility Management Function (AMF), a list of Single NSSAIs (S-NSSAIs) available for a User Equipment (UE) from the AMF, wherein sending the response to the query for the NSSAI comprises sending the list of S-NSSAIs available for the UE received from the AMF.

30. A non-transitory computer readable medium storing software instructions that when executed by one or more processors of a client device that allows slice consumers within or attached to the client device to access and use Network Slice Selection Assistance Information (NSSAI), cause the client device to:
receive, at an Application Programming Interface (API) layer within the client device, a query for NSSAI, the query being sent by a slice consumer;
send, to a Fifth Generation (5G) modem within the client device, the query for NSSAI;
receive, from the 5G modem, a response to the query for NSSAI;
send, to the slice consumer, the response to the query for NSSAI; and
in response the receiving the query for NSSAI, fetching, by the 5G modem and from a Core Access and Mobility Management Function (AMF), a list of Single NSSAIs (S-NSSAIs) available for a User Equipment (UE) from the AMF, wherein sending the response to the query for the NSSAI comprises sending the list of S-NSSAIs available for the UE received from the AMF.

* * * * *